(12) United States Patent
Uno

(10) Patent No.: US 7,975,101 B2
(45) Date of Patent: Jul. 5, 2011

(54) STORAGE MEDIUM STORING DRIVE CONFIGURATION SETTING PROGRAM

(75) Inventor: Fumitoshi Uno, Okazaki (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 424 days.

(21) Appl. No.: 11/689,057

(22) Filed: Mar. 21, 2007

(65) Prior Publication Data

US 2007/0233973 A1 Oct. 4, 2007

(30) Foreign Application Priority Data

Mar. 30, 2006 (JP) ................................ 2006-095511

(51) Int. Cl.
G06F 12/00 (2006.01)
(52) U.S. Cl. ............................... 711/114; 711/E12.084
(58) Field of Classification Search .......... 711/170–173, 711/114
See application file for complete search history.

(56) References Cited

U.S. PATENT DOCUMENTS

| | | | |
|---|---|---|---|
| 5,539,590 A | 7/1996 | Tateishi | |
| 7,373,472 B2 * | 5/2008 | Bhasin et al. | 711/170 |
| 2004/0212831 A1 | 10/2004 | Imai et al. | |
| 2005/0023339 A1 | 2/2005 | Uno | |
| 2005/0149676 A1 * | 7/2005 | Shimada et al. | 711/114 |

FOREIGN PATENT DOCUMENTS

| | | |
|---|---|---|
| JP | 07-085571 | 3/1995 |
| JP | 08-098123 | 4/1996 |
| JP | 2002-324040 | 11/2002 |
| JP | 2004-503015 | 1/2004 |
| JP | 2004-272457 | 9/2004 |
| JP | 2005-216141 | 8/2005 |
| JP | 2006-011955 | 1/2006 |

OTHER PUBLICATIONS

Office Action for Japanese Application 2006-095511 mailing date of Jan. 26, 2010.

* cited by examiner

Primary Examiner — Reginald G Bragdon
Assistant Examiner — Hamdy S Ahmed
(74) Attorney, Agent, or Firm — Banner & Witcoff, Ltd.

(57) ABSTRACT

A storage medium stores a set of program instructions including: acquiring a number of at least one virtual unit with which at least one of a plurality of storage units is associated, the number of at least one virtual unit being set smaller than a total number of the plurality of storage units; receiving, from an operating system, a first command that specifies one of the at least one virtual unit; registering, as an accessible storage unit, a single storage unit from among the at least one of the plurality of storage units that is associated with the one of the at least one virtual unit specified by the first command, the single storage unit being in condition for communicating data with a data processing device; and outputting, to a peripheral device, a second command that specifies the accessible storage unit based on the first command.

9 Claims, 18 Drawing Sheets

| V-LUN | P-LUN | PRIORITY |
|---|---|---|
| 0 | 0 | 1 |
|   | 1 | 2 |
|   | 2 | 3 |
|   | 3 | 4 |
| 1 | – | – |
| 2 | – | – |
| 3 | – | – |

STORAGE MEDIUM STORING DRIVE CONFIGURATION SETTING PROGRAM

CROSS REFERENCE TO RELATED APPLICATIONS

This application claims priority from Japanese Patent Application No. 2006-095511 filed Mar. 30, 2006. The entire content of the priority application is incorporated herein by reference.

TECHNICAL FIELD

The invention relates to a storage medium storing a drive configuration setting program, and particularly to a storage medium storing a drive configuration setting program that is user-friendly and that facilitates the user in recognizing a peripheral device connected to a data processing device, without requiring special modifications to the peripheral device.

BACKGROUND

In recent years, there has been an increase in the popularity of card-type storage media (hereinafter referred to simply as "media") employing flash memory or the like. There are many variations of this media, including CompactFlash (registered trademark; hereinafter also abbreviated as "CF"), SmartMedia (registered trademark; hereinafter also abbreviated as "SM"), Memory Stick (registered trademark; hereinafter also abbreviated as "MS"), Secure Digital Cards (registered trademark; hereinafter also abbreviated as "SD"), Microdrives (registered trademark), MultiMediaCards (registered trademark), xD-Picture Cards (registered trademark), Memory Stick Duo, and miniSD Cards (registered trademark). This type of media has such advantages as not requiring a drive system and, therefore, have been used primarily in digital cameras, notebook PCs, and cell phones for which low power consumption and portability are high priorities.

There are also a number of memory card readers/writers well known in the art, which are peripheral devices that enable a user to access this media from a personal computer or the like for data reading and writing. The types of memory card readers/writers include a single-slot reader/writer equipped with one slot for inserting media, a multi-slot reader/writer provided with a plurality of slots so that data can be accessed from a plurality of media types, and a reader/writer with internal flash memory in addition to the card slots.

SUMMARY

FIGS. 1A and 1B are perspective views of an example of a multi-slot reader/writer 200. As shown in FIG. 1A, the multi-slot reader/writer 200 has various slots formed in the front surface thereof, including a first slot 211 for inserting a CF card, a second slot 212 for inserting an SM card, a third slot 213 for inserting an MS card, and a fourth slot 214 for inserting an SD card. As shown in FIG. 1B, a USB terminal 209 is provided on the rear surface of the multi-slot reader/writer 200 for connecting a USB cable.

If this type of multi-slot reader/writer 200 is connected to a personal computer, for example, it is necessary to install software (i.e., a driver) on the personal computer so that the personal computer can access the slots provided in the multi-slot reader/writer 200 or, more specifically, to access the media inserted in the slots. However, the number of slots that the personal computer can access may be limited by the type of operating system (OS) running on the personal computer.

For example, while drivers supporting only single-slot memory card readers/writers are installed as standard in relatively older OS versions (hereinafter referred to as a "low-level OS"), such as the Windows 98SE operating system (WINDOWS is a registered trademark) and Windows 2000 operating system, drivers supporting both single-slot and multi-slot readers/writers are installed as standard in more recent OS versions (hereinafter referred to as a "high-level OS"), such as Windows Me operating system and Windows XP operating system.

Therefore, when the multi-slot reader/writer 200 is connected to a personal computer running a low-level OS, the driver installed in the low-level OS cannot simultaneously recognize a plurality of slots. In order to access each slot, some readers/writers well known in the art are equipped with two slots and a priority selection switch for setting priorities for the slots. In this way, the personal computer can access only one of the slots selected by the priority selection switch.

When this multi-slot reader/writer is connected to a universal serial bus (USB) terminal on the personal computer, a Plug-and-Play function provided in the OS automatically performs the required settings. At this time, firmware provided in the multi-slot reader/writer notifies the OS in the personal computer of the slot priority order based on the setting of the priority selection switch.

If a low-level OS is installed on the personal computer at this time, a driver supporting the single-slot memory card reader/writer (hereinafter referred to as a "single-slot reader/writer") is installed as standard in the OS. Consequently, the OS only recognizes the slot set to the highest priority by the priority selection switch. Hence, the personal computer can only read data from and write data to media inserted in this high-priority slot.

On the other hand, if a high-level OS is installed on the personal computer, a driver supporting multi-slot readers/writers is installed as standard in the OS. This driver assigns a drive to each of the slots, enabling the personal computer to perform read/write accesses individually (independently) for each type of media mounted in each slot. In the case of a high-level OS in which this driver support is standard, the OS assigns a drive to each of the slots based on the order of priority set by the priority selection switch.

For example, if the reader/writer has an SM slot and a CF slot and the priority selection switch gives priority to the SM slot, then, assuming that the OS has already assigned the A drive to a floppy (registered trademark) disk drive (FDD) and the C drive to a hard disk drive (HDD), the D drive is assigned to the SM slot and the E drive to the CF slot. Conversely, if the priority selection switch gives priority to the CF slot, then the OS assigns the D drive to the CF slot and the E drive to the SM slot.

With the low-level OS, the drive assignment can be changed by reactivating the Plug-and-Play function in the OS after switching the priority selection switch. More specifically, reactivating the Plug-and-Play function involves either restarting the OS on the personal computer or unplugging the USB cable from the terminal on the personal computer and subsequently reconnecting the cable to the terminal.

With the high-level OS, it is possible to modify the drive assignments (drive letters) for the slots by reactivating the Plug-and-Play function after switching the priority selection switch.

Also, when using a multi-slot reader/writer having an internal flash memory in addition to a plurality of card slots, a memory card reader/writer with an internal flash memory having only a single card slot, and the like, the above-described driver supporting the multi-slot readers/writers is necessary for assigning drives to each card slot and to the internal flash memory, enabling the personal computer to perform individual (independent) read/write accesses on each media type mounted in the slots and the internal flash memory.

Hence, in the following description, memory card readers/writers requiring a driver that supports a multi-card reader/writer, including those devices with internal flash memory described above, will be referred to as a "multi-reader/writer," and the driver supporting this reader/writer will be referred to as a "multi-support driver."

In recent years, a large variety of memory devices (media) have been commercialized, as described above. When attempting to manufacture a multi-reader/writer capable of directly reading and writing data with this media without an adapter when the media is inserted into slots in the reader/writer, a priority selection switch capable of switching among multiple levels is required for a low-level OS, for example, greatly increasing the complexity of the device structure.

Further, when the reader/writer is connected to a personal computer running a high-level OS, drives are individually assigned to all of the slots in the reader/writer. Many problems have occurred in common multi-readers/writers well known in the art, including the multi-slot readers/writers described above that are provided with a priority selection switch, when drives are assigned to each slot.

For example, when connecting a multi-reader/writer equipped with CF, SM, MS, and SD slots and an internal flash memory to a personal computer running a high-level OS, the OS of the personal computer assigns the A drive to the FDD, the C drive to the HDD, the D drive to a CD-ROM drive (CDD), the E drive to the internal flash memory, the F drive to the CF slot, the G drive to the SM slot, the H drive to the MS slot, and the I drive to the SD slot, for example.

FIG. 2 is a sample screenshot showing the drive configuration displayed on a personal computer connected to the reader/writer by a USB cable. As shown in the drawing, the personal computer recognizes all of the E, F, G, H, and I drives corresponding to the internal flash memory and the slots of the multi-reader/writer generically as individual removable disks. Therefore, "Removable Disk" is displayed in the window displaying the drive configuration ("My Computer" in Windows) for all drives corresponding to the multi-reader/writer.

This configuration has the potential of being less user-friendly when the following problems (1)-(4) occur.

(1) After inserting media into one of the slots of the reader/writer, the user may be unable to determine in which drive the media was inserted due to the numerous removable disks displayed in the drive configuration window.

(2) There may be cases in which the drive letters (E, F, G, H, and I in the present example) cannot be allocated for the removable disks when there are multiple requests to assign network drives according to regulations and the like in a company setting, for example.

(3) If the personal computer is equipped with multiple HDDs or if the HDD is divided into a plurality of partitions, securing multiple drive letters for the removable disks in addition to the numerous drive letters already assigned to the HDDs or partitions thereof can be difficult, because Windows only allows the allocation of 26 drives from A to Z.

(4) The user may feel that the "My Computer" window is cluttered with all of the removable disk drives displayed therein.

The above problems are more pronounced the more types of media being used. For example, if the multi-reader/writer is equipped with slots for inserting the 8 types of media described above and a PC Card without an adapter as well as an internal flash memory (i.e., capable of reading/writing data for a total of 10 types of media), 8 independent removable disks are established (displayed) on the personal computer. Here, only 8 removable disks are established on the personal computer for the 10 types of media because the CF and Microdrive and the SD and MultiMediaCard have compatible standards and, therefore, each pair can be supported in a common slot.

U.S. Patent Application Publication No. 2005/0023339 (corresponding to Japanese Patent Application Publication No. 2005-216141) proposes an information processing system as one method for resolving the problems described above. The information processing system is configured of a personal computer and a multi-reader/writer configured to make the personal computer recognize media used with high frequency as independent drives and to use a single drive letter, for example, for all media used with low frequency (or else not to recognize media used with low frequency).

FIG. 3 is a sample screenshot showing the drive configuration displayed on a PC connected to a multi-reader/writer to which the technology disclosed in U.S. Patent Application Publication No. 2005/0023339 has been applied. In the example of FIG. 3, the single drive letter F is shared with CF and SD media, and the single drive letter G is shared with SM and MS media.

Further, an application is provided on the personal computer for assigning drive letters to the media types based on the user's preference. The multi-reader/writer reads these settings on the personal computer and operates based on the settings. Thus, the user can clear up clutter in the "My Computer" window and can conserve drive letters by combining media used with less frequency under a single drive while assigning drive letters independently to media used frequently, thereby providing a user-friendly information processing system.

However, the above-described information processing system requires modifications in the hardware or firmware of the multi-reader/writer so that the reader/writer operates in accordance with drive letter assignments set on the personal computer. This is problematic in that modifications in hardware or firmware are more difficult than modifications in software, resulting in an increase in production costs, and the above-described technology cannot be applied to multi-readers/writers that are now on the market or are currently in use.

In view of the foregoing, it is an object of the invention to provide a storage medium storing a drive configuration setting program that is user-friendly and that facilitates the user in recognizing a peripheral device connected to a data processing device, without requiring special modifications to the peripheral device.

In order to attain the above and other objects, the invention provides a storage medium storing a set of program instructions executable on a data processing device that is configured to be connected to a peripheral device having a plurality of storage units. The data processing device has an operating system that manages the plurality of storage units. The set of program instructions includes: acquiring a number of at least one virtual unit with which at least one of the plurality of storage units is associated, the number of at least one virtual unit being set smaller than a total number of the plurality of storage units; receiving, from the operating system, a first command that specifies one of the at least one virtual unit; registering, as an accessible storage unit, a single storage unit from among the at least one of the plurality of storage units that is associated with the one of the at least one virtual unit specified by the first command, the single storage unit being in condition for communicating data with the data processing device; and outputting, to the peripheral device, a second command that specifies the accessible storage unit based on the first command.

According to another aspect, the invention also provides a method for managing a peripheral device having a plurality of storage units and connected to a data processing device. The method includes: acquiring a number of at least one virtual unit with which at least one of the plurality of storage units is associated, the number of at least one virtual unit being set smaller than a total number of the plurality of storage units; receiving, from an operating system stored in the data processing device, a first command that specifies one of the at least one virtual unit; registering, as an accessible storage unit, a single storage unit from among the at least one of the plurality of storage units that is associated with the one of the at least one virtual unit specified by the first command, the single storage unit being in condition for communicating data with the data processing device; and outputting, to the peripheral device, a second command that specifies the accessible storage unit based on the first command.

BRIEF DESCRIPTION OF THE DRAWINGS

Illustrative aspects in accordance with the invention will be described in detail with reference to the following figures wherein:

FIG. 8 is a table conceptually illustrating an LUN map;

DETAILED DESCRIPTION

A storage medium storing a drive configuration setting program according to a first embodiment of the invention will be described while referring to FIGS. 4 through 11.

Figure 4:
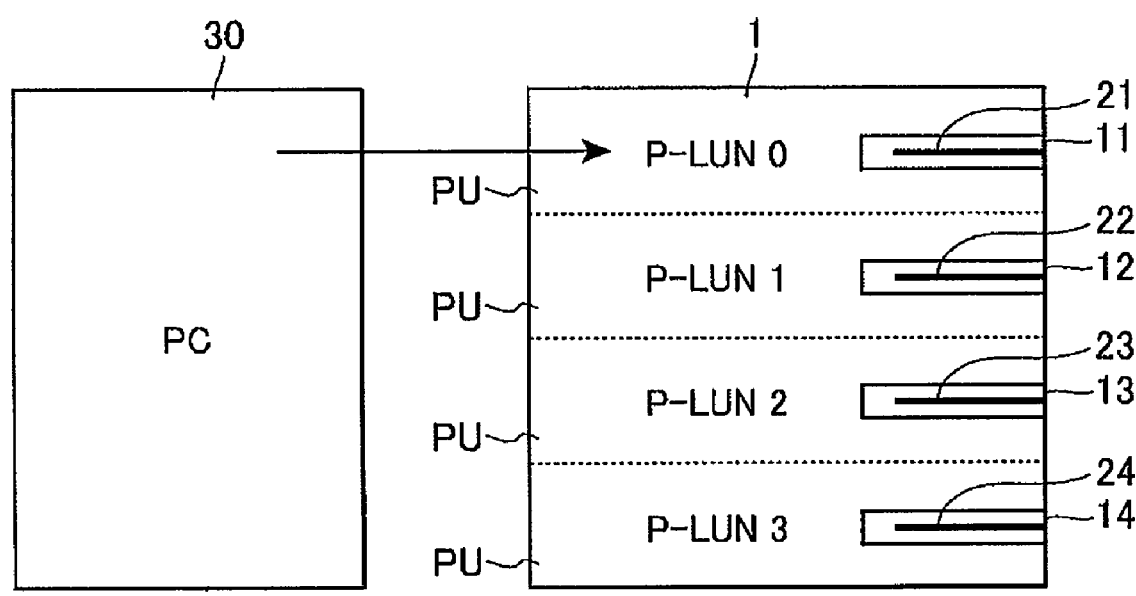
FIG. 4 is a block diagram conceptually illustrating a multi-reader/writer and a personal computer executing a filter driver according to a first embodiment of the invention.

FIG. 4 conceptually illustrates a personal computer 30 running a filter driver serving as a drive configuration setting program, and a multi-reader/writer 1 (multi-slot memory card reader/writer) connected to the personal computer 30 and capable of exchanging data with the same. As shown in FIG. 4, the multi-reader/writer 1 functions as a peripheral device to the personal computer 30 and includes a first slot 11 for inserting a first external memory card (CF in the present embodiment) 21, a second slot 12 for inserting a second external memory card (SM in the present embodiment) 22, a third slot 13 for inserting a third external memory card (MS in the present embodiment) 23, and a fourth slot 14 for inserting a fourth external memory card (SD in the present embodiment) 24.

Hence, while the multi-reader/writer 1 is a single physical device, since the multi-reader/writer 1 includes four slots 11, 12, 13, and 14 for mounting four types of external memory cards 21, 22, 23, and 24, the multi-reader/writer 1 functions as four logical units for reading data from or writing data to each different type of memory card. In this specification, these logical units are called physical logical units PU. Each physical logical unit PU is assigned a logical unit number (LUN) for uniquely identifying the four physical logical units PU in the multi-reader/writer 1. In the present specification, the logical unit number assigned to each physical logical unit PU is referred to as a physical logical unit number (P-LUN).

In the present embodiment, P-LUN0 is assigned to the physical logical unit PU reading or writing data with the first external memory card 21; P-LUN1 is assigned to the physical logical unit PU reading or writing data with the second external memory card 22; P-LUN2 is assigned to the physical logical unit PU reading or writing data with the third external memory card 23; and P-LUN3 is assigned to the physical logical unit PU reading or writing data with the fourth external memory card 24.

The personal computer 30 transmits a command specifying one of the physical logical units PU, such as a SCSI command specifying the physical logical unit P-LUN0, in order to execute a process enabling data communications with the specified physical logical unit (P-LUN0). Thus, a data processing system is constructed in which the personal computer 30 can access each of the external memory cards 21, 22, 23, and 24 mounted in the slots 11, 12, 13, and 14 of the multi-reader/writer 1.

Figure 5:
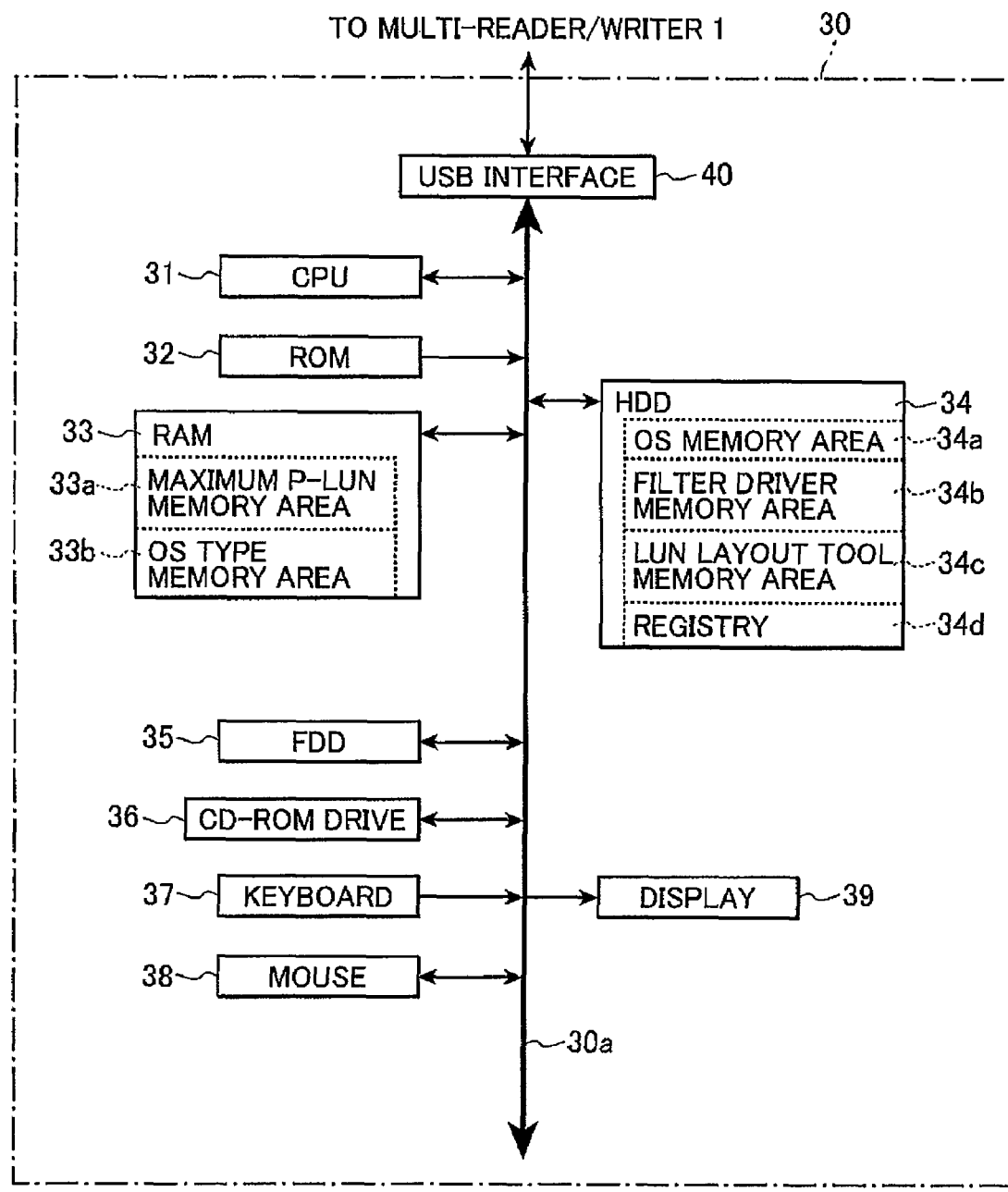
FIG. 5 is a block diagram illustrating the electrical structure of the personal computer.

Next, the structure of the personal computer 30, which functions as a data processing device, will be described with reference to FIG. 5. FIG. 5 is a block diagram showing the electrical structure of the personal computer 30. As shown in FIG. 5, the personal computer 30 includes a CPU 31, a ROM 32, a RAM 33, a hard disk drive (HDD) 34, a flexible disk drive (FDD) 35, a CD-ROM drive 36, a keyboard 37, a mouse 38, and a display 39. These components are all connected to one another via a bus 30a. The personal computer 30 also includes a USB interface 40 and is connected to the multi-reader/writer 1 via the USB interface 40 and a USB cable 26 (see FIG. 6).

The CPU 31 executes processes according to various programs stored in the ROM 32 and the OS and various application programs installed on the HDD 34. However, of particular importance to the present embodiment, the CPU 31 implements functions of an OS kernel 60 (see FIG. 9) and a file system 61 (see FIG. 9) according to the OS installed on the HDD 34, and executes a process indicated in the flowchart of FIG. 11 according to a filter driver 62 (see FIG. 9), which is an application installed on the HDD 34.

The RAM 33 includes a maximum P-LUN memory area 33a and an OS type memory area 33b. The maximum P-LUN memory area 33a stores the maximum number (MAX-P-LUN) of P-LUNs acquired from the multi-reader/writer 1. The OS type memory area 33b stores data indicating whether the OS stored in an OS memory area 34a described later is a high-level OS or a low-level OS. In the present embodiment, a high-level OS is an operating system which has installed as standard a driver capable of simultaneously recognizing a single peripheral device (such as the multi-reader/writer 1) connected to the personal computer 30 by a USB cable as a plurality of logical units and capable of independently accessing each logical unit. A low-level OS is an operating system having installed as standard a driver capable of recognizing only one logical unit in a peripheral device connected to the personal computer 30 by a USB cable.

The HDD 34 includes the OS memory area 34a mentioned above, a filter driver memory area 34b, an LUN layout tool memory area 34c, and a registry 34d. In the first embodiment, a high-level OS is stored in the OS memory area 34a. Below, a second embodiment will be described for the case of a low-level OS stored in the OS memory area 34a.

Figure 9:
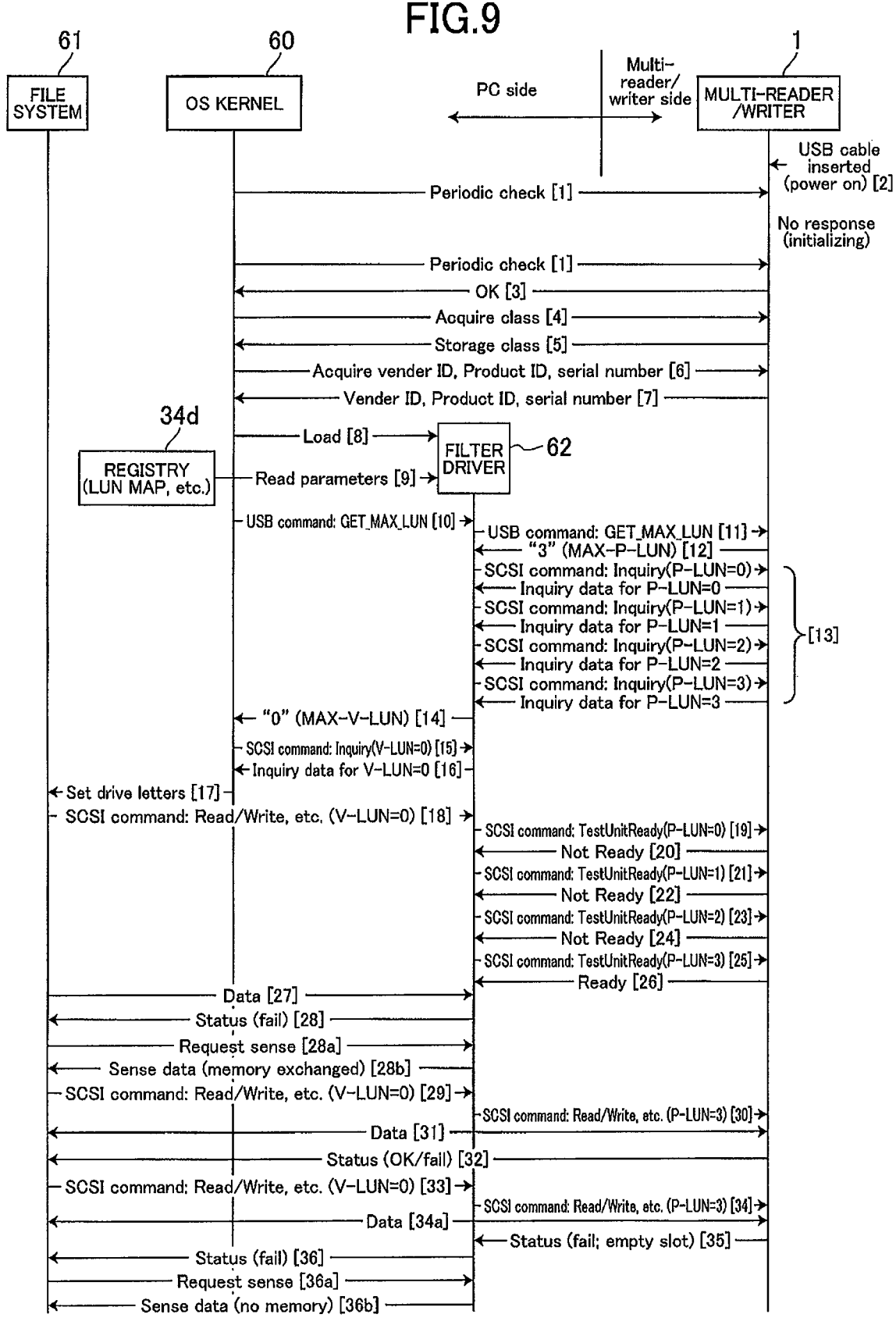
FIG. 9 is an explanatory diagram conceptually illustrating data communication between the personal computer and the multi-reader/writer.

The filter driver memory area 34b stores the filter driver 62 (see FIG. 9). The filter driver 62 operates in the lower level of the OS. All data exchanged between the OS and the multi-reader/writer 1 passes through the filter driver 62.

Figure 10:
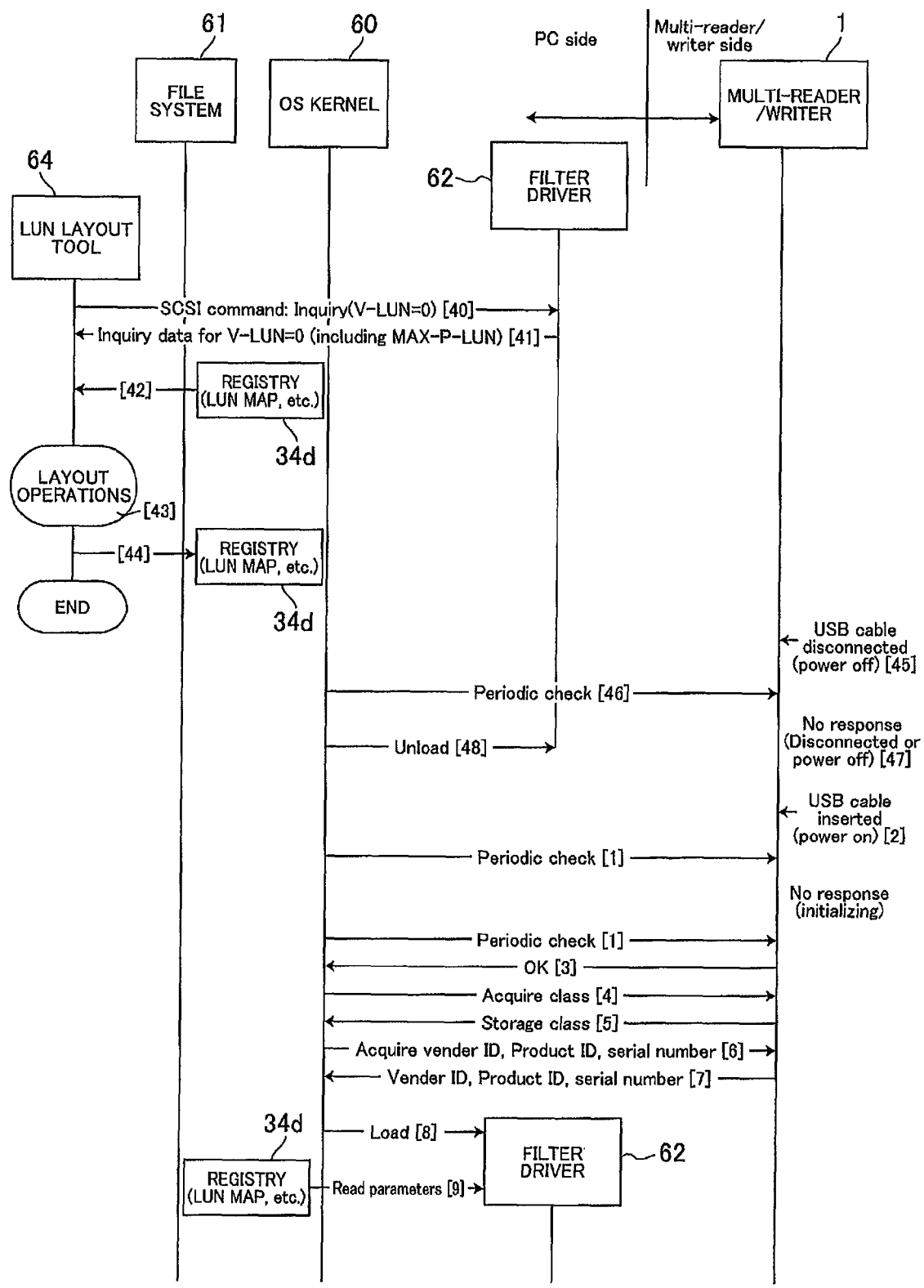
FIG. 10 is an explanatory diagram conceptually illustrating data communication between the personal computer and multi-reader/writer when the user starts an LUN layout tool.

The LUN layout tool memory area 34c stores an LUN layout tool 64 (see FIG. 10). The LUN layout tool 64 is an application by which the user can arbitrarily set the "LUN layout" indicating a drive (logical unit) configuration in which the personal computer 30 recognizes the multi-reader/writer 1. The LUN layout will be described later.

The registry 34d is a file for centrally managing configuration settings of the OS and applications. Relative to the present embodiment, the registry 34d includes a description of an LUN map 63 (see FIG. 8). The LUN map 63 is data used to manage the LUN layout and will be described later in detail. When modified by the LUN layout tool 64, the LUN map 63 described in the registry 34d is automatically updated.

Figure 6:
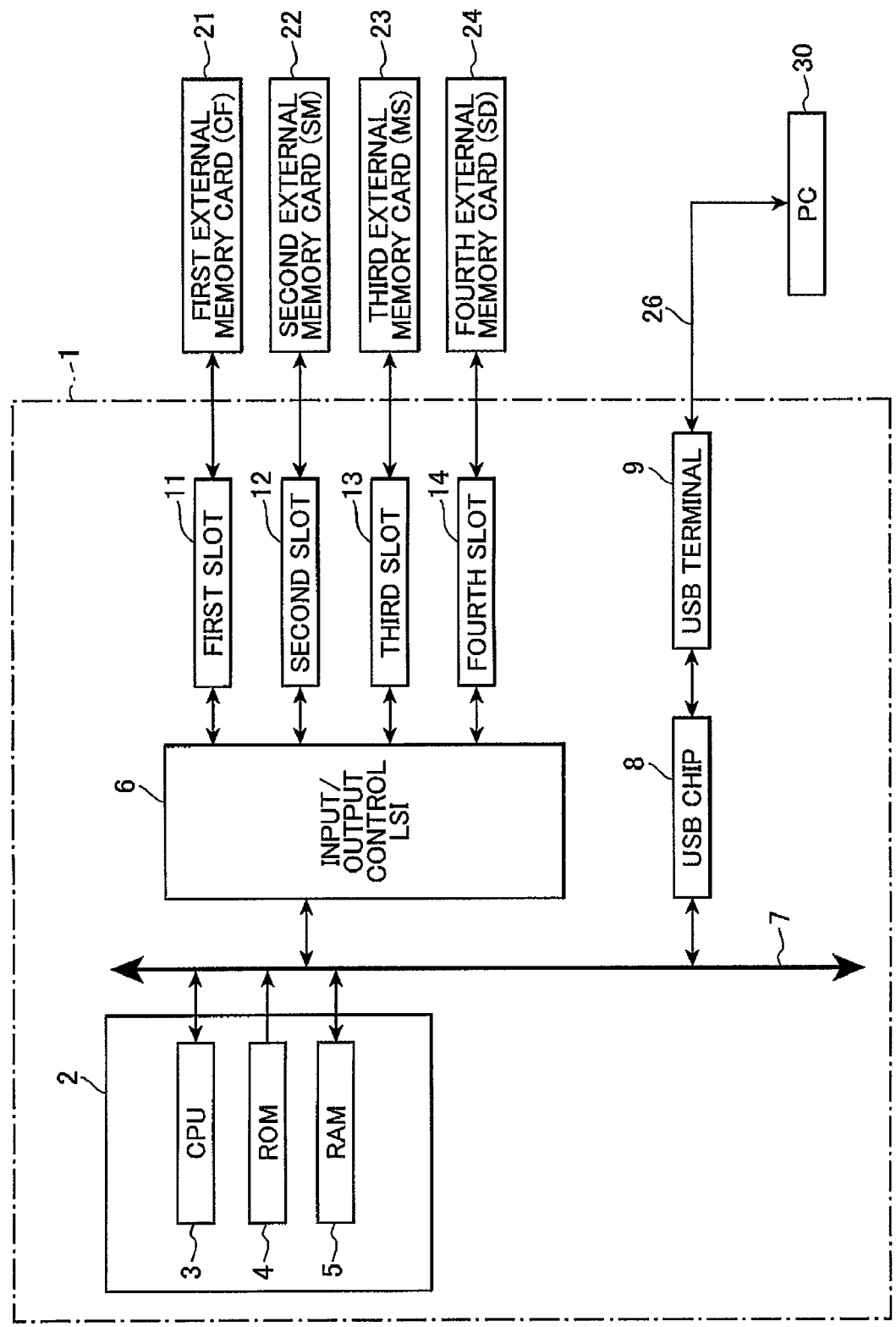
FIG. 6 is a block diagram illustrating the electrical structure of the multi-reader/writer.

FIG. 6 is a block diagram showing the electrical structure of the multi-reader/writer 1. As shown in FIG. 6, the multi-reader/writer 1 includes a microcomputer 2 for controlling each component in the multi-reader/writer 1; an input/output control LSI 6 for controlling data input and output for the external memory cards 21, 22, 23, and 24 mounted in the slots 11, 12, 13, and 14; a USB chip 8 for controlling data communications according to the USB specifications; and a USB terminal 9 for communicating data with the personal computer 30. These components are connected together via a bus 7.

The microcomputer 2 has a common configuration including a CPU 3, a ROM 4, and a RAM 5. The CPU 3 performs various processes according to programs and data stored in the ROM 4. The ROM 4 stores programs for responding to various commands received from the personal computer 30, including USB commands and SCSI commands. These commands will be described in greater detail below.

Each of the slots 11, 12, 13, and 14 are equipped with a memory detection switch (not shown) that physically turns on when the respective external memory card 21, 22, 23, or 24 is inserted. When the memory detection switch turns on, a detection signal outputted from the switch via the input/output control LSI 6 generates an interrupt in the CPU 3. Therefore, when one of the external memory cards 21, 22, 23, and 24 is inserted into the corresponding slot 11, 12, 13, or 14, the CPU 3 can recognize the slot in which a memory card has been inserted. In the present embodiment, the multi-reader/writer 1 operates by power supplied from the personal computer 30 via the USB cable 26 (bus power).

Figure 1A:
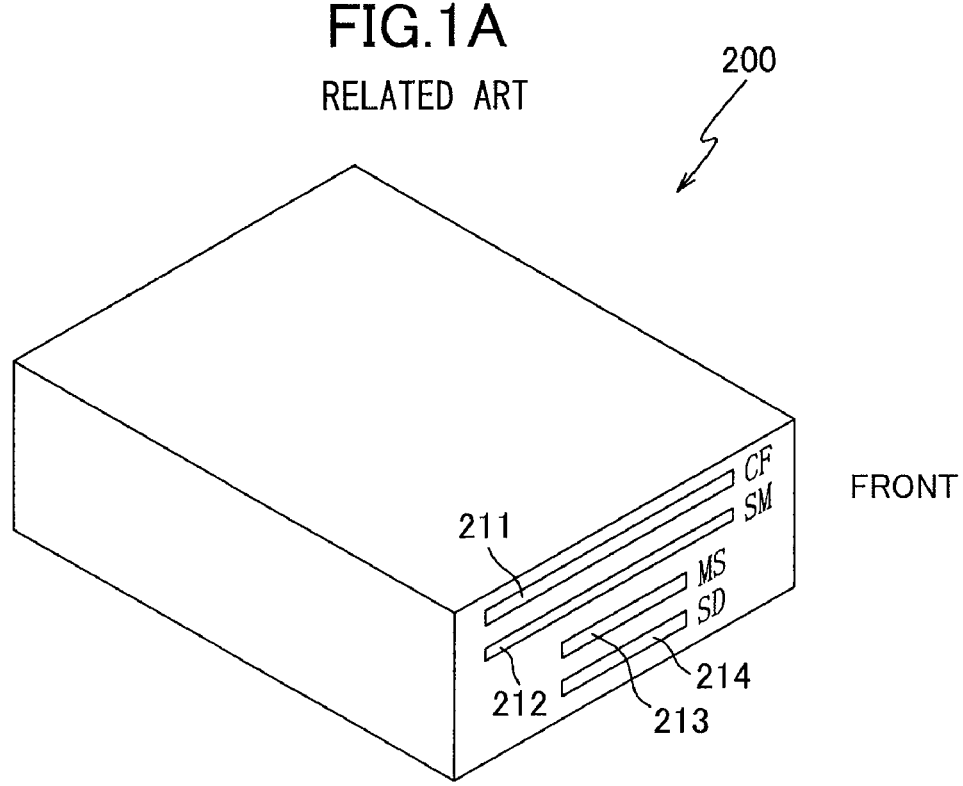
FIG. 1A is a perspective view of an example of a multi-reader/writer as viewed from the front.
Figure 1B:
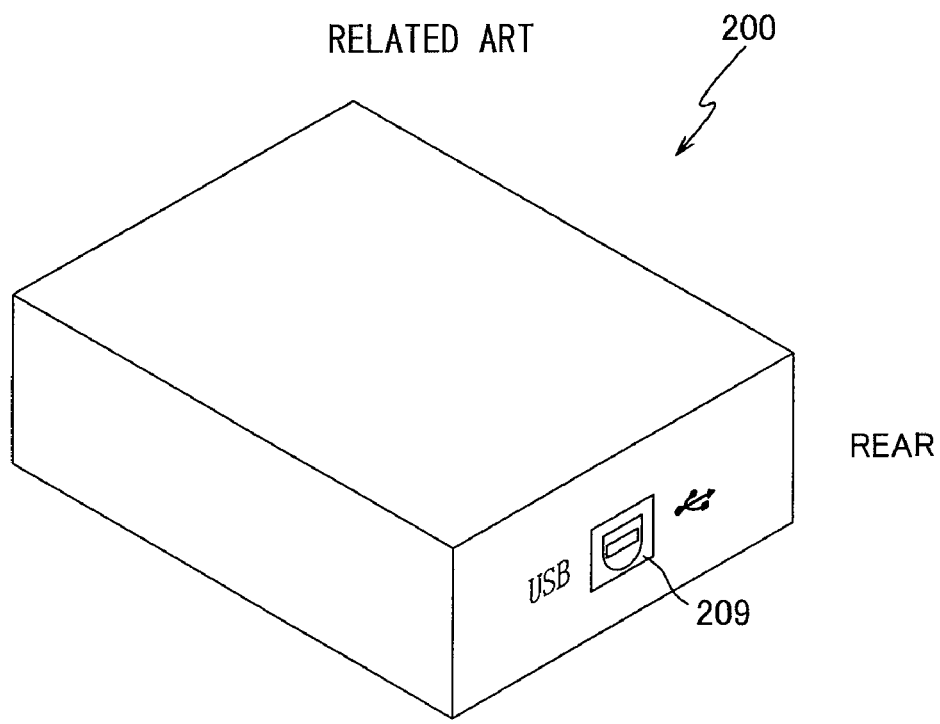
FIG. 1B is a perspective view of the multi-reader/writer as viewed from the rear.
Figure 2:
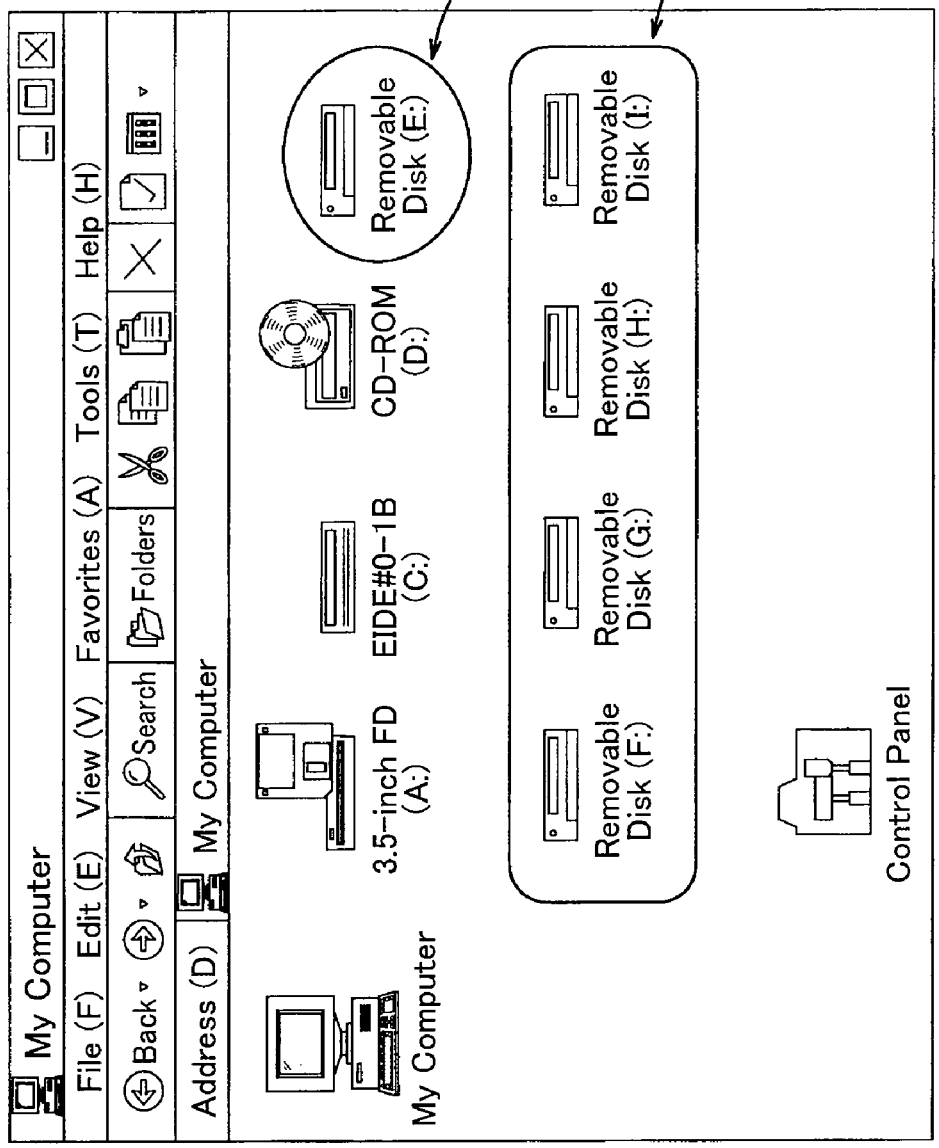
FIG. 2 is a screenshot showing a sample window displaying the drive configuration on a personal computer connected to the multi-reader/writer via a USB cable.
Figure 3:
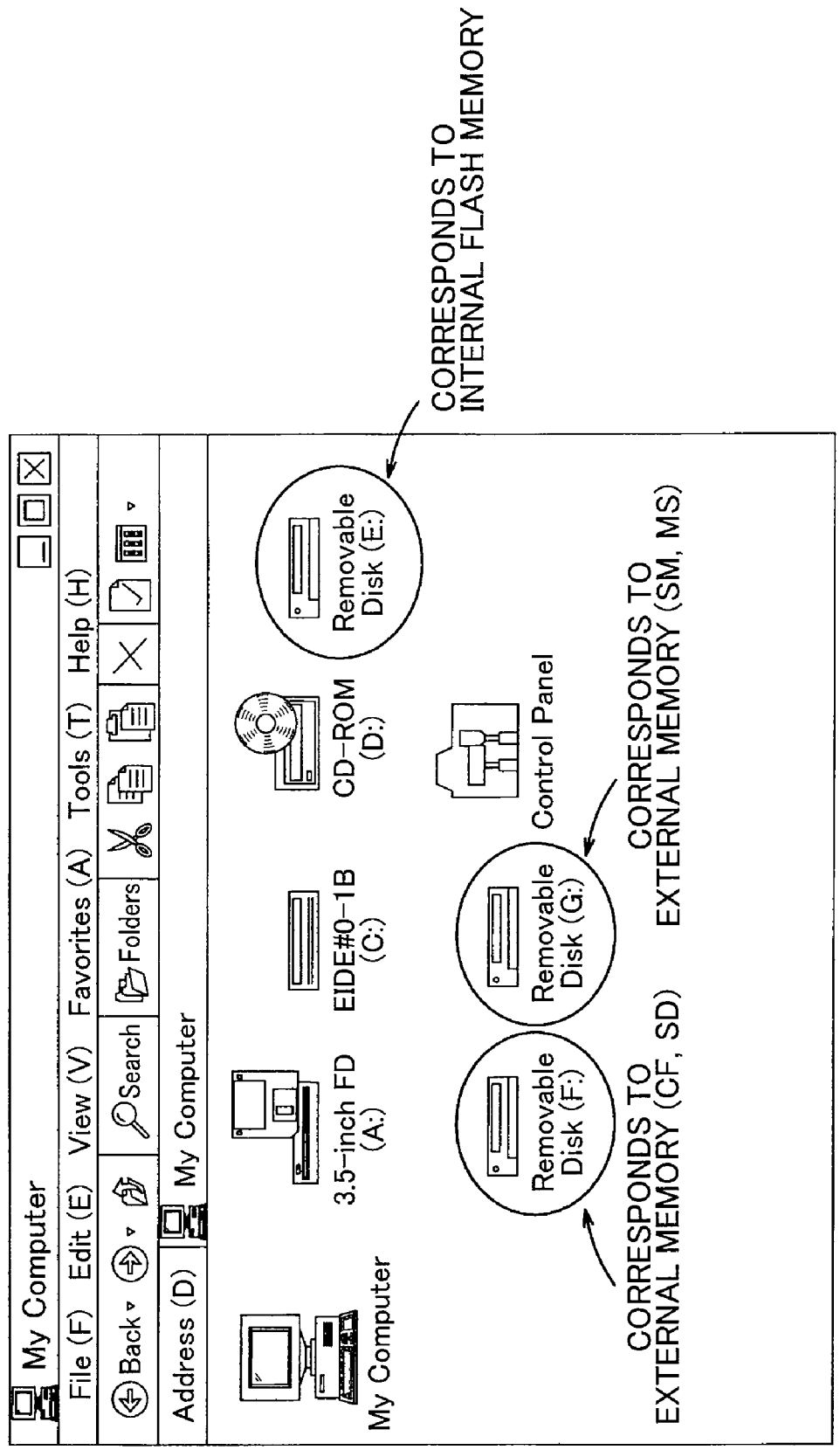
FIG. 3 is a screenshot showing a sample window displaying the drive configuration on a personal computer connected to another multi-reader/writer.

When the multi-reader/writer 1 is connected to the personal computer 30 with the USB cable 26 via the USB terminal 9, the OS of the personal computer 30 recognizes the multi-reader/writer 1. If the OS installed on the personal computer 30 is a high-level OS, the OS can recognize each individual physical logical unit PU in the multi-reader/writer 1. Hence, a conventional personal computer 30 would recognize the multi-reader/writer 1 as four logical units. Further, a drive configuration window for displaying connected devices or logical units as icons on the personal computer 30, such as the "My Computer" window in Windows, would display the single multi-reader/writer 1 connected to the personal computer 30 as four logical units (see FIG. 2). However, when all physical logical units PU on the multi-reader/writer 1 are recognized individually in this way, it is necessary to allocate drive letters of a number equivalent to the number of physical logical units PU, potentially leading to problems in allocating a sufficient number of drive letters. Further, when a large number of logical units are displayed in the drive configuration window, the window itself may appear too cluttered to the user.

Therefore, the present embodiment is configured to make the user perceive the multi-reader/writer 1 as having less logical units than the actual number of physical logical units PU. In the present embodiment, the logical units recognized on the personal computer 30 for the user are referred to as virtual logical units VU. A virtual logical unit number (V-LUN) is assigned to each of the virtual logical units VU for uniquely identifying these units.

Figure 7A:
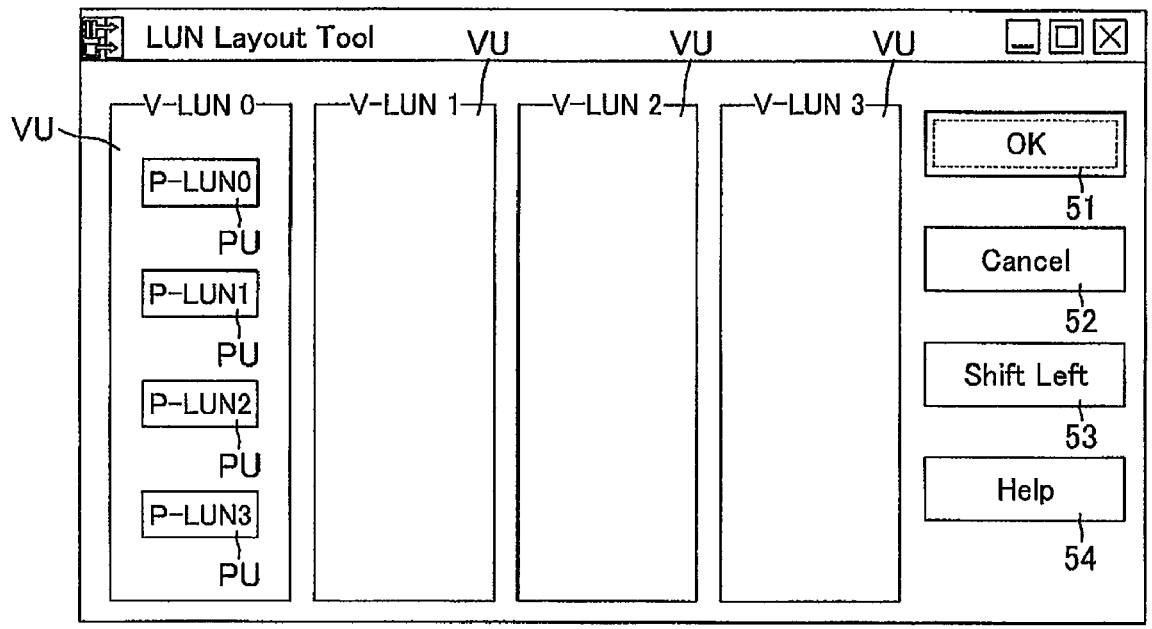
FIG. 7A is a screenshot showing a sample LUN layout setting window.

Next, the virtual logical units VU set in the personal computer 30 will be described with reference to FIGS. 7A and 7B. FIG. 7A shows an example of the LUN layout settings window. The LUN layout settings window allows the user to set correspondence relationships between the virtual logical units VU and physical logical units PU (hereinafter referred to as the LUN layout).

As shown in FIG. 7A, each of the four physical logical units of the multi-reader/writer 1 (P-LUN0, P-LUN1, P-LUN2, and P-LUN3) are associated with one of the virtual logical units VU. In the present embodiment, all four of the physical logical units are associated with a single virtual logical unit (V-LUN0).

Figure 7B:
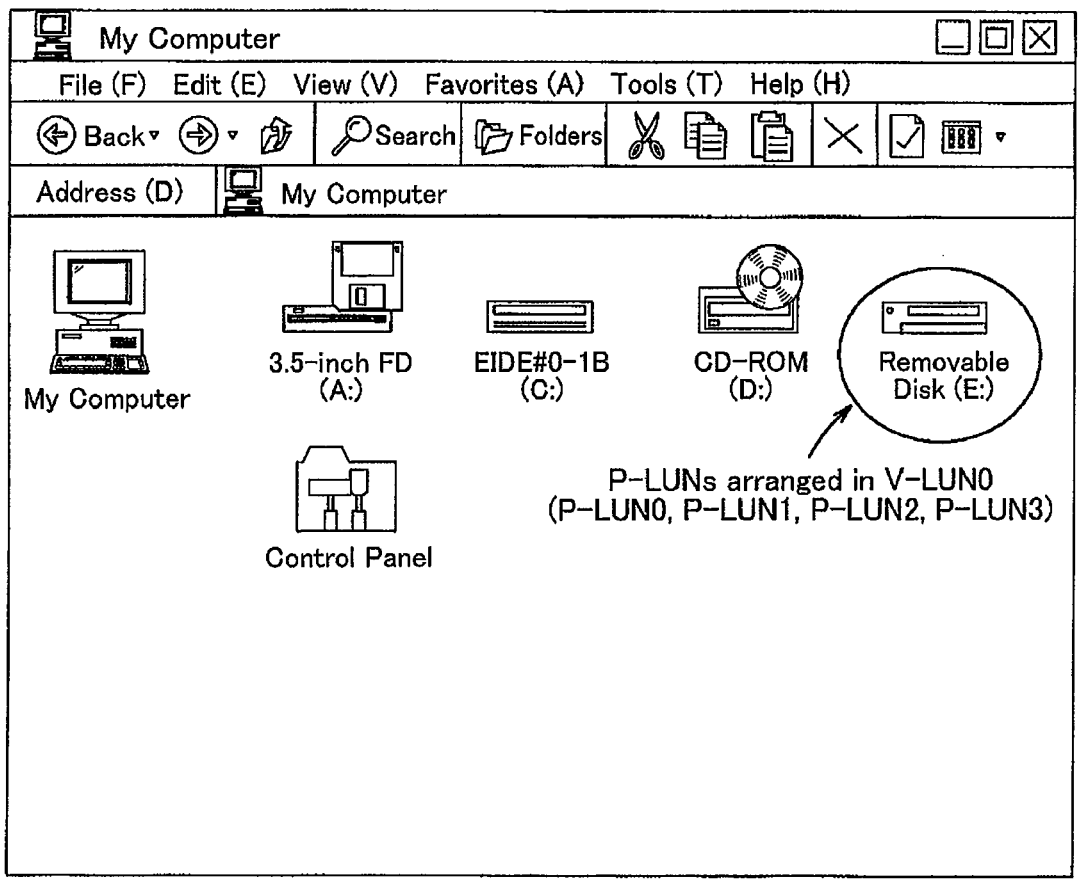
FIG. 7B is a screenshot showing a sample drive configuration window displayed according to the LUN layout shown in FIG. 7A.

FIG. 7B shows an example of a drive configuration window displayed according to the LUN layout shown in FIG. 7A. This drive configuration window displays a list of devices or logical units individually accessible from the personal computer 30 as icons. In the LUN layout shown in FIG. 7A, all physical logical units (P-LUN0, P-LUN1, P-LUN2, and P-LUN3) have been associated with a single virtual logical unit (V-LUN0). Therefore, when the drive configuration window is displayed on the display 39, the multi-reader/writer 1 displays a single icon indicating a removable disk (assigned the drive letter E), as shown in the example of FIG. 7B. This method conserves the number of drive letters being used and displays the multi-reader/writer 1 in a way that is easily recognizable by the user.

Returning to FIG. 7A, the LUN layout settings window is displayed on the display 39 of the personal computer 30 when the LUN layout tool 64 is started and displays the current settings for the LUN layout.

As shown in FIG. 7A, the LUN layout settings window displays the virtual logical units VU, and the physical logical units PU associated with those virtual logical units VU. In addition, the window displays an OK button 51, a Cancel button 52, a Shift Left button 53, and a Help button 54.

The user can freely move each of the physical logical units PU to any of the virtual logical units VU by dragging and dropping the icons representing the physical logical units PU in the box corresponding to the desired virtual logical unit VU using the mouse 38, for example. Hence, the user can set a desired layout.

When the icons are arranged as desired, the user clicks on the OK button 51 to set the current LUN layout. However, if the user clicks on the OK button 51 while a box with no icons exists in front (i.e., left in FIG. 7A) of a box with icons, the icons are automatically shifted forward (left) to fill in the empty box, and the resulting LUN layout is set. Once the LUN layout is set by clicking the OK button 51, the LUN layout tool 64 overwrites the LUN map 63 described later.

However, if the user clicks on the Cancel button 52, the LUN layout tool 64 forcibly quits, ignoring any changes made up to that point. Further, if a virtual logical unit VU box having no icons exists in front of (i.e., in a box having a smaller V-LUN number) a box containing an icon, the user can click on the Shift Left button 53 to automatically shift icons forward into the empty box so that no empty boxes exist in front of a box with icons. Having empty boxes to the rear of (i.e., with a larger V-LUN number than) boxes containing icons is not a problem (for example, all boxes to the rear of the virtual logical unit V-LUN0 are empty in the example of FIG. 7A). By clicking on the Help button 54, the user can display instructions on how to use the LUN layout tool 64.

When the user first starts the LUN layout tool, the current layout is first displayed in the LUN layout settings window. Accordingly, the user can check the current layout and make changes to this layout as needed. Further, the user can visually check the changes being made while performing a simple operation of dragging and dropping icons, making setting the LUN layout reliable and efficient.

Figure 8:
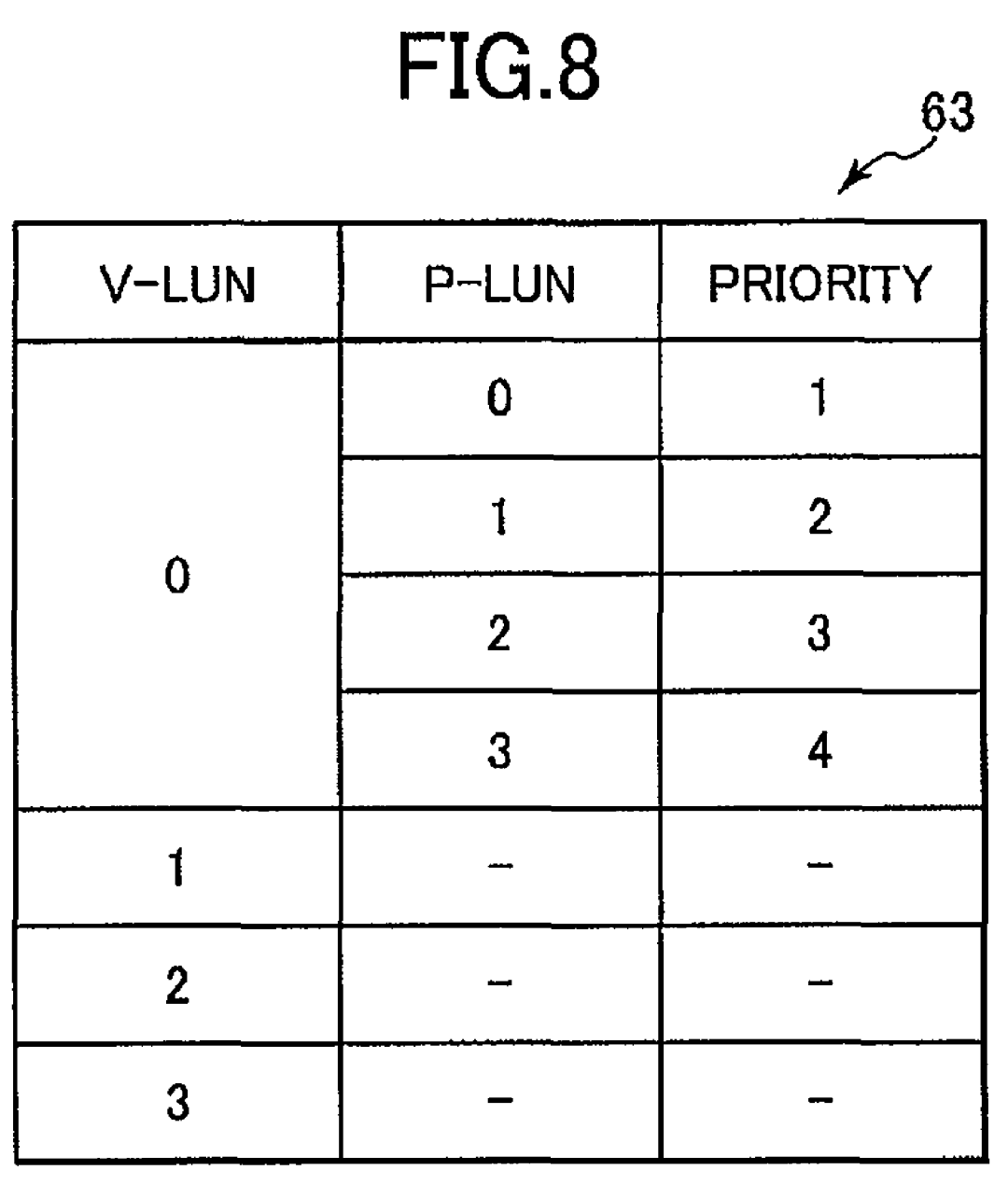

FIG. 8 conceptually illustrates the LUN map 63 described in the registry 34d (see FIG. 8). As shown in FIG. 8, the LUN map 63 describes correspondence relationships between the V-LUNs and P-LUNs, and also includes an order of priority among P-LUNs associated with the same V-LUN. This order of priority determines the order in which the P-LUNs are displayed in the LUN layout settings window.

As shown in the LUN map 63 of FIG. 8, the P-LUN column is blank when no P-LUNs are associated with the corresponding V-LUN. The largest V-LUN to which at least one P-LUN is associated is called the largest virtual logical unit number (MAX-V-LUN). The MAX-V-LUN is stored in the registry 34d together with the LUN map 63. Since all P-LUNs have been associated with V-LUN0 in the LUN map 63 shown in FIG. 8, the MAX-V-LUN is "0".

Next, various data exchanges between the above-described personal computer 30 and the multi-reader/writer 1 will be described with reference to FIG. 9. FIG. 9 conceptually illustrates data communications between the personal computer 30 and multi-reader/writer 1. As shown in FIG. 9, the OS kernel 60 periodically checks for the existence of a connection with the multi-reader/writer 1 [11]. When the multi-reader/writer 1 is connected to the personal computer 30 with the USB cable 26 and the personal computer 30 begins to supply bus power to the multi-reader/writer 1, the multi-reader/writer 1 is powered on and begins operations [2].

Note that, in FIGS. 9, 10, 12, and 16, the lines connecting the file system 61 (or the OS kernel 60) and the multi-reader/writer 1 and perpendicularly crossing the vertical line of the filter driver 62 (the line shown as "DATA [31]" in FIG. 9, for example) indicate that the filter driver 62 temporarily receives commands or data from the file system 61 (or the OS kernel 60) and then forwards the commands or data to the multi-reader/writer 1, or temporarily receives and then forwards commands or data in the opposite direction. In contrast, the lines connecting the file system 61 (or the OS kernel 60) and the multi-reader/writer 1 and not crossing the vertical line of the filter driver 62 (the line shown as "PERIODIC CHECK [1]" in FIG. 9, for example) indicate that commands or data do not go through the filter driver 62.

Upon startup, the multi-reader/writer 1 first performs an initialization process. The CPU 3 executes this initialization process based on a program in the ROM 4 upon startup. After startup, the CPU 3 copies required parameters to the RAM 5 used in actual operations. The multi-reader/writer 1 is busy during this initialization process and cannot respond to the periodic checks from the personal computer 30 until the initialization process is complete.

After the necessary parameters are copied to the RAM 5 and operating preparations are complete, the multi-reader/writer 1 responds to the periodic check from the personal computer 30 indicating that the multi-reader/writer 1 is ready [3]. When the personal computer 30 receives this response, the OS kernel 60 issues a request to the multi-reader/writer 1 to acquire the class of the multi-reader/writer 1 [4], and the multi-reader/writer 1 responds with "storage class" [5]. In this way, the personal computer 30 recognizes the multi-reader/writer 1 as a large capacity storage device.

Next, the OS kernel 60 issues a request to the multi-reader/writer 1 to acquire the vendor name (VID), product name (PID), and serial number [6]. The multi-reader/writer 1 responds with the vendor name, product name, and serial number [7].

Next, the OS kernel 60 loads the filter driver 62 [8]. The filter driver 62 reads the LUN map 63 (see FIG. 8) and required parameters such as the largest virtual logical unit number MAX-V-LUN from the registry 34d [9].

Next, the OS kernel 60 issues the USB command "GET_MAX_LUN" to the multi-reader/writer 1 requesting the number of logical units in the multi-reader/writer 1 [10]. This "GET_MAX_LUN" command asks for the total number of logical units to be recognized by the OS. Interpreted another way, this command indicates that the OS provided in the personal computer 30 is a high-level OS having a multi-support driver installed.

Upon receiving this USB command "GET_MAX_LUN," the filter driver 62 executes a GET_MAX_LUN reception process. The GET_MAX_LUN reception process is described in greater detail below with reference to FIG. 11, but a brief description will be given here. First, the filter driver 62 issues the USB command "GET_MAX_LUN" [11]. Upon receiving the USB command "GET_MAX_LUN," the multi-reader/writer 1 executes a GET_MAX_LUN response process. The CPU 3 executes this process according to a program stored in the ROM 4 upon receiving the USB command "GET_MAX_LUN" and returns the largest P-LUN (MAX- P-LUN) [12]. Since the largest P-LUN in the multi-reader/writer 1 is "3", as shown in FIG. 4, the multi-reader/writer 1 returns "3".

Upon receiving a response to the USB command "GET_MAX_LUN," the filter driver 62 stores the received value in the maximum P-LUN memory area 33*a* (see FIG. 5). From this response, the filter driver 62 recognizes that there are P-LUNs from "0" to "3" (i.e., four physical logical units PU). Hence, the filter driver 62 subsequently issues the SCSI command "Inquiry" specifying each of the physical logical units PU in order and receives responses to these commands [13]. The SCSI command requests the type of device at the SCSI level for each physical logical unit (P-LUN0, P-LUN1, P-LUN2, and P-LUN3, in this example).

Upon receiving the SCSI command "Inquiry," the multi-reader/writer 1 executes an Inquiry command response process. Specifically, the CPU 3 executes this process according to a program stored on the ROM 4 when the "Inquiry" command is received and returns data indicating the type of device for each physical logical unit PU. The data indicates whether the device is a "direct access device" or "removable," and indicates the product name and the like.

Upon receiving these responses, the filter driver 62 stores the received data in the RAM 33. Subsequently, the filter driver 62 returns the largest virtual logical unit number MAX-V-LUN read from the registry 34*d* to the OS kernel 60 [14]. In this example, the filter driver 62 returns "0" as the MAX-V-LUN.

Next, the OS kernel 60 issues a SCSI command "Inquiry (V-LUN=0)" [15]. In other words, the OS kernel 60 is requesting the device type for the logical unit recognized by the OS kernel 60 (the virtual logical unit V-LUN0). The filter driver 62 returns inquiry data in response [16].

In the present embodiment, the inquiry data returned by the filter driver 62 is the vendor ID and product name of the filter driver 62 itself, the MAX-P-LUN received from the multi-reader/writer 1, and data indicating that the OS is a high-level OS. In the present embodiment, inquiry data returned from the filter driver 62 to the OS is always the same data.

Next, the OS kernel 60 establishes drive letters for the file system 61 [17]. Through this process, a drive letter is assigned to the virtual logical unit V-LUN0. Since all of the physical logical units PU are associated with a single virtual logical unit (V-LUN0), the multi-reader/writer 1 is displayed as a single logical unit assigned the drive letter E in the drive configuration window (see FIG. 7B) and, hence, appears to the user as a single logical unit.

Next, the file system 61 issues a SCSI command of some type specifying the virtual logical unit to which the drive letter has been assigned (V-LUN0) [18]. Here, an example will be described for the file system 61 issuing the SCSI command "Read/Write (V-LUN=0)." Note that the filter driver 62 functions the same way even if the file system 61 issues a SCSI command other than the Read/Write command.

When the filter driver 62 receives the SCSI command "Read/Write (V-LUN=0)" from the file system 61, the filter driver 62 issues the SCSI command "TestUnitReady" for each P-LUN corresponding to V-LUN0 in the LUN map 63. The order in which the filter driver 62 issues the SCSI commands "TestUnitReady" is based on the priorities assigned each P-LUN in the LUN map 63. The SCSI command "TestUnitReady" is issued for the P-LUNs corresponding to V-LUN0 in order until the response "Ready" is returned.

As indicated in FIG. 7B, the P-LUNs associated with V-LUN0 in the LUN map 63 are "0", "1", "2", and "3" and are prioritized in this order. Hence, the filter driver 62 first issues the SCSI command "TestUnitReady (P-LUN=0)" to the multi-reader/writer 1 [19]. This SCSI command "TestUnitReady (P-LUN=0)" is an inquiry to determine whether a memory card corresponding to the P-LUN0 (the first external memory card (CF) 21, in the present embodiment) is inserted in the first slot 11. If the first external memory card 21 is inserted in the first slot 11, the multi-reader/writer 1 indicates this by returning the command "Ready." In this example, the first external memory card 21 is not inserted in the first slot 11, and the multi-reader/writer 1 indicates this by returning the command "Not Ready" [20].

Next, the filter driver 62 issues the SCSI command "TestUnitReady (P-LUN=1)" to the multi-reader/writer 1 [21]. This time the filter driver 62 is inquiring whether a memory card corresponding to the P-LUN1 (the second external memory card (SM) 22, in the present embodiment) is inserted in the second slot 12. In this example, the second external memory card 22 is not inserted in the second slot 12, and the multi-reader/writer 1 indicates this by returning the command "Not Ready" [22].

Next, the filter driver 62 issues the SCSI command "TestUnitReady (P-LUN=2)" to the multi-reader/writer 1 [23]. This time the filter driver 62 is inquiring whether a memory card corresponding to the P-LUN2 (the third external memory card (MS) 23, in the present embodiment) is inserted in the third slot 13. In this example, the third external memory card 23 is not inserted in the third slot 13, and the multi-reader/writer 1 indicates this by returning the command "Not Ready" [24].

Next, the filter driver 62 issues the SCSI command "TestUnitReady (P-LUN=3)" to the multi-reader/writer 1 [25]. This time the filter driver 62 is inquiring whether a memory card corresponding to the P-LUN3 (the fourth external memory card (SD) 24, in the present embodiment) is inserted in the fourth slot 14. In this example, the fourth external memory card 24 is inserted in the fourth slot 14, and the multi-reader/writer 1 indicates this by returning the command "Ready" [26]. Consequently, the P-LUN3 can be registered as the physical logical unit PU associated with the V-LUN0 that can be accessed by specifying the V-LUN0.

The filter driver 62 issues inquiries in order from the physical logical unit PU having the highest priority and halts the inquiry process as soon as a "Ready" response is received from one of the physical logical units PU. Therefore, if two or more external memory cards are inserted into slots, the physical logical unit PU assigned the highest priority in the LUN map 63 (see FIG. 8) among these slots is registered as the accessible physical logical unit PU.

When data is subsequently opened from the file system 61 [27], the filter driver 62 reads and discards this data without transferring the data to the multi-reader/writer 1 and transmits a status to the file system 61 indicating that the data communication failed [28]. Upon receiving this status, the file system 61 issues a SCSI command "Request Sense" requesting sense data [28a]. In response to this command, the filter driver 62 issues sense data indicating that memory has been exchanged [28b]. Note that the sense data is data that returns contents of error in SCSI protocol, and is also called "SCSI error data".

Upon receiving this sense data indicating that memory has been exchanged, the file system 61 discards the previously used memory management data. The file system 61 also reissues the SCSI command "Read/Write (V-LUN=0)" [29]. However, this time the physical logical unit P-LUN3 has been registered as the accessible physical logical unit corresponding to the V-LUN0.

Hence, when the filter driver 62 receives the SCSI command "Read/Write (V-LUN=0)," the filter driver 62 modifies the SCSI command to the SCSI command "Read/Write (P-LUN3)." In other words, the filter driver 62 modifies the command to specify the physical logical unit P-LUN3 registered as the accessible physical logical unit PU and issues this modified command to the multi-reader/writer 1 [30].

Through this process, data reading and writing can be performed between the file system 61 and the multi-reader/writer 1. Specifically, the multi-reader/writer 1 transmits data and a status [31] and [32] in response to the SCSI command "Read/Write" from the file system 61.

Next, a description will be given for the case in which the memory card associated with the physical logical unit P-LUN3 (the fourth external memory card 24 in this example) is removed from the fourth slot 14 while repeating the process described above.

When the file system 61 issues the SCSI command "Read/Write (V-LUN=0)" [33], the filter driver 62 modifies this SCSI command to "Read/Write (P-LUN3)," as described above, and issues the modified SCSI command [34].

The file system 61 transmits data, via the filter driver 62, to the multi-reader/writer 1 and receives data in response [34a]. However, if the fourth external memory card 24 associated with the physical logical unit P-LUN3 has been removed from the fourth slot 14, then the multi-reader/writer 1 issues a status indicating that the data communication failed and a status indicating that no memory exists in the slot [35]. Upon receiving this status, the filter driver 62 cancels the registration for the physical logical unit P-LUN3 as the accessible logical unit for the virtual logical unit V-LUN0. Hence, the V-LUN0 is returned to an unregistered state.

The filter driver 62 also issues a status to the multi-reader/writer 1 indicating that the data communication failed [36]. Upon receiving this status, the file system 61 issues a SCSI command "Request Sense" requesting sense data [36a]. In response, the filter driver 62 returns sense data indicating no memory [36b].

Accordingly, when the file system 61 issues a SCSI command "Read/Write (V-LUN=0)" thereafter, the process returns to [19] so that the filter driver 62 can determine the physical logical unit PU that is accessible by the specification of the virtual logical unit V-LUN0. Consequently, the physical logical unit PU associated with the virtual logical unit V-LUN0 and corresponding to newly inserted external memory is registered as the new accessible physical logical unit.

Next, an example in which the user performs an operation to modify the LUN layout will be described with reference to FIG. 10. FIG. 10 conceptually illustrates data communication between the personal computer 30 and the multi-reader/writer 1 when the user executes the LUN layout tool 64.

When the user starts the LUN layout tool 64, the LUN layout tool 64 initially issues the SCSI command "Inquiry" [40]. As described in [16] in FIG. 9, the filter driver 62 returns inquiry data to the LUN layout tool 64 [41].

Next, the LUN layout tool 64 reads the LUN map 63 from the registry 34d [42]. Subsequently, the LUN layout tool 64 displays the LUN layout settings window (see FIG. 7A) on the display 39 of the personal computer 30 based on the LUN map 63 read above, thereby showing the user the current LUN layout.

At this time, the user performs the layout operations described with reference to FIG. 7A to arrange the icons as desired and sets the new LUN layout [43]. The LUN layout tool 64 overwrites the LUN map 63 with the new data [44] and ends the process.

After modifying the LUN layout with the LUN layout tool 64, the user subsequently disconnects the USB cable 26 or switches off the multi-reader/writer 1 according to the operation manual or instructions given on the display 39 [45].

Hence, when the OS kernel 60 subsequently transmits a periodic check [46], the multi-reader/writer 1 does not reply [47]. Based on this lack of response, the personal computer 30 can detect that the USB cable 26 of the multi-reader/writer 1 has been disconnected, and the OS kernel 60 unloads the filter driver 62 [48].

If the personal computer 30 and multi-reader/writer 1 are subsequently reconnected with the USB cable 26, power is again supplied to the multi-reader/writer 1, turning the multi-reader/writer 1 on [2]. At this time, the process from [1] to [9] described above with reference to FIG. 9 is repeated. Once again, the required parameters are read from the LUN map 63 [9]. However, since the parameters are read from the LUN map 63 after modifications have been made, all subsequent processes are performed based on the modified LUN map 63.

Figure 11:
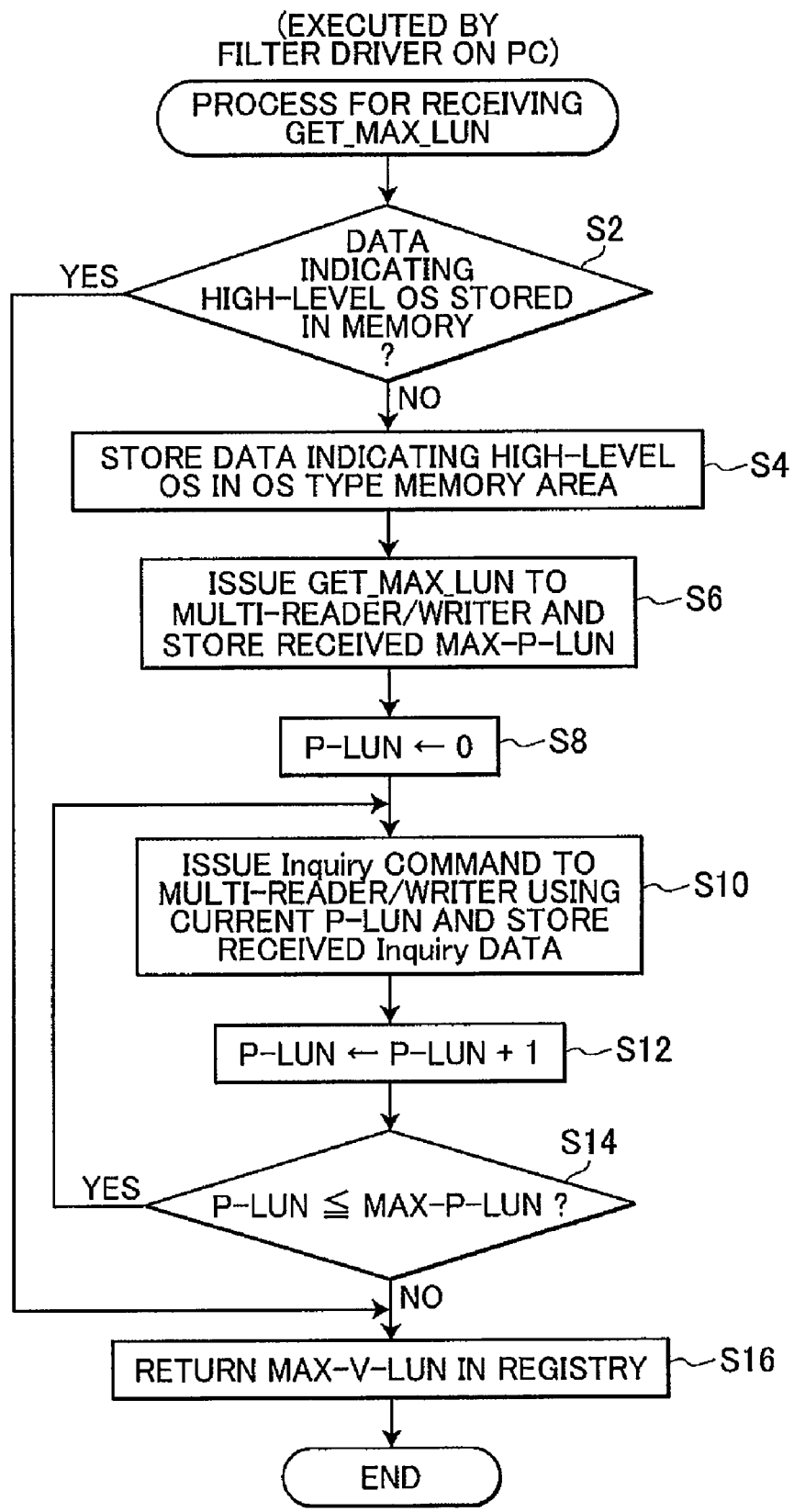
FIG. 11 is a flowchart illustrating steps in a GET_MAX_LUN reception process.

Next, the GET_MAX_LUN reception process will be described with reference to FIG. 11. FIG. 11 is a flowchart illustrating steps in the GET_MAX_LUN reception process. This process begins when the OS kernel 60 issues the USB command "GET_MAX_LUN" and corresponds to steps [10] through [14] in FIG. 9.

When the OS kernel 60 issues the USB command "GET_MAX_LUN," in S2 the filter driver 62 determines whether the type stored in the OS type memory area 33b indicates that the OS stored in the OS memory area 34a is a high-level OS. If such data has not yet been stored in the OS type memory area 33b (S2: NO), then in S4 the filter driver 62 stores this data in the OS type memory area 33b because the fact that the OS issues the USB command "GET_MAX_LUN" indicates that the OS is a high-level OS.

Next, in S6 the filter driver 62 issues the USB command "GET_MAX_LUN" to the multi-reader/writer 1 and stores the largest P-LUN (MAX-P-LUN) received from the multi-reader/writer 1 in response to this USB command "GET_MAX_LUN" in the maximum P-LUN memory area 33a. In S8 the filter driver 62 sets a variable P-LUN to "0".

In S10 the filter driver 62 issues the SCSI command "Inquiry" including the P-LUN indicated by the variable P-LUN, acquires inquiry data returned from the multi-reader/writer 1 in response to this command and stores the data in the RAM 33. Since the variable P-LUN is "0" initially, the filter driver 62 stores inquiry data for the physical logical unit P-LUN0 in the RAM 33 at this time.

In S12 the filter driver 62 increments the variable P-LUN by "1". In S14 the filter driver 62 determines whether the value of the variable P-LUN is less than or equal to the MAX-P-LUN (largest P-LUN).

While the value of the variable P-LUN is less than or equal to MAX-P-LUN (S14: YES), the filter driver 62 returns to S10 and repeats the process described above. However, when the value of the variable P-LUN exceeds the MAX-P-LUN while repeating the process described above (S14: NO), indicating that inquiry data has been acquired for all physical logical units PU, then in S16 the filter driver 62 returns the MAX-V-LUN read from the registry 34d to the OS kernel 60. From the perspective of the OS kernel 60, the OS kernel 60 receives the MAX-V-LUN (i.e., the largest number among virtual logical unit numbers V-LUN) as a response to the USB command "GET_MAX_LUN," which is an inquiry for the number of logical units in a connected device.

If the filter driver 62 determines in S2 described above that the OS type memory area 33b already stores data indicating that the OS stored in the OS memory area 34a is a high-level OS (S2: YES), then the filter driver 62 skips the process described from S4 to S14 and simply returns the MAX-V-LUN stored in the LUN map 63 in S16.

In the first embodiment described above, the filter driver 62 associates physical logical units PU in the multi-reader/writer 1 to virtual logical units VU in the personal computer 30 of a number smaller than the number of physical logical units PU, thereby reducing the number of logical units perceived by the user, simplifying the display in the drive configuration window, and conserving the number of assigned drive letters. Further, despite a plurality of physical logical units PU being associated with the same virtual logical unit VU, the filter driver 62 sets the physical logical unit PU for which external memory is actually mounted in the slot as the accessible logical unit, thereby enabling accesses to the external memory corresponding to this accessible logical unit. If the external memory is later exchanged, the filter driver 62 automatically detects the physical logical unit PU for which external memory is actually inserted, and registers this physical logical unit PU as the accessible logical unit, without requiring the user to restart the personal computer 30 or perform some other troublesome task, such as disconnecting and reconnecting the USB cable 26 in order to switch the physical logical unit PU being used.

Further, since the process for associating physical logical units PU with virtual logical units VU is implemented by the filter driver 62, modifications in the multi-reader/writer 1 are unnecessary. Hence, from the user's perspective, any multi-reader/writer 1 on hand can be used simply by installing the filter driver 62 on the personal computer 30.

Further, the LUN layout tool 64 enables the user to freely set correspondence relationships between the physical logical units PU and virtual logical units VU. Hence, the user can combine memory devices used with low frequency in a single drive (virtual logical unit VU), thereby conserving drive letters and producing a less cluttered drive configuration window. At the same time, the user can assign single drive letters independently to physical logical units PU used with greater frequency, thereby providing a user-friendly data processing system.

Next, a second embodiment of the process that the filter driver 62 executes in the personal computer 30 will be described with reference to FIGS. 12 and 13. While a high-level OS was stored in the OS memory area 34a in the first embodiment described above, a low-level OS is stored in the OS memory area 34a of the personal computer 30 in the second embodiment. In the second embodiment, like parts and components to those in the first embodiment have been designated with the same reference numerals to avoid duplicating description.

Figure 12:
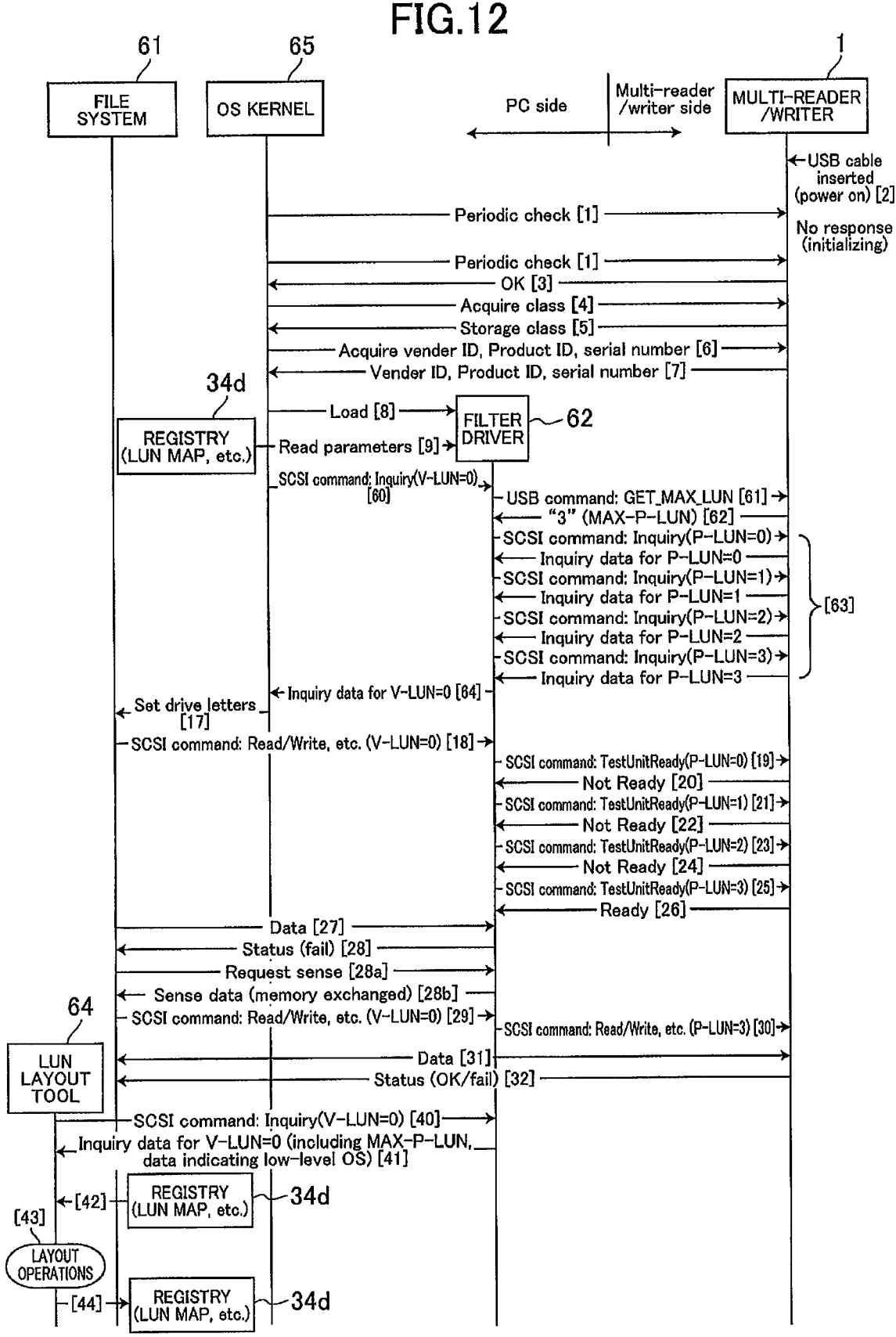
FIG. 12 is an explanatory diagram illustrating data communication between the personal computer and multi-reader/writer according to a second embodiment.
Figure 13:
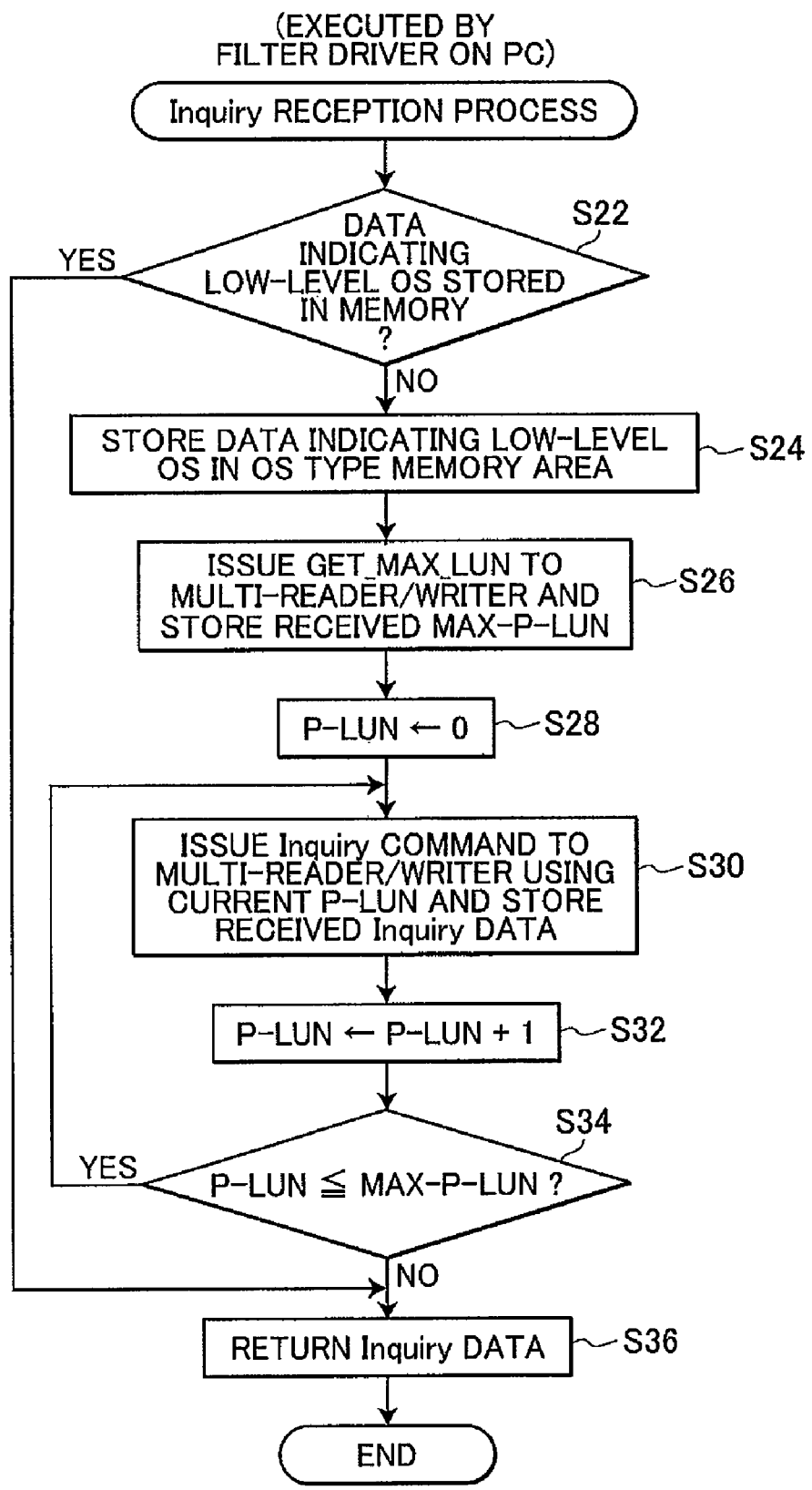
FIG. 13 is a flowchart illustrating steps in an Inquiry reception process.

FIG. 12 shows data exchanges between the personal computer 30 and multi-reader/writer 1 in the second embodiment. As described above, a low-level OS is stored in the OS memory area 34a of the personal computer 30 in the second embodiment. Accordingly, an OS kernel 65 of the personal computer 30 operates differently from the file system 61 in the first embodiment. In the description of data exchanges shown in FIG. 12, steps identical to those described in FIG. 9 have been designated with the same step numbers to avoid duplicating description.

When a low-level OS is stored in the OS memory area 34a, the OS kernel 65 issues the SCSI command "Inquiry (V-LUN=0)" [60]. In the first embodiment, the OS kernel 60 was able to treat a plurality of logical units in a single peripheral device since a high-level OS was stored in the OS memory area 34a. Accordingly, the OS kernel 60 issued the USB command "GET_MAX_LUN" requesting the total number of logical units (the highest logical unit number).

However, in the second embodiment, the driver installed as standard in the low-level OS treats one peripheral device as one logical unit. Therefore, the driver issues the SCSI command "Inquiry (V-LUN=0)" requesting the type of device, rather than requesting the total number of logical units.

Upon receiving this SCSI command "Inquiry (V-LUN=0)," the filter driver 62 executes an inquiry reception process. Since this process is described later in detail with reference to FIG. 13, only a brief description will be given here. First, the filter driver 62 issues the USB command "GET_MAX_LUN" [61]. Upon receiving the USB command "GET_MAX_LUN," the multi-reader/writer 1 returns the largest P-LUN (MAX-P-LUN) [62].

When a reply to the USB command "GET_MAX_LUN" is received, the filter driver 62 stores the received value in the maximum P-LUN memory area 33a (see FIG. 5). Next, the filter driver 62 issues SCSI commands "Inquiry" to the multi-reader/writer 1 and receives replies to these commands [63].

Upon receiving each reply, the filter driver 62 stores the data received for each P-LUN in the RAM 33. Subsequently, the filter driver 62 returns inquiry data to the OS kernel 65 [64]. In the present embodiment, the inquiry data returned by the filter driver 62 includes the vendor ID and product ID of the filter driver 62 itself, the largest P-LUN (MAX-P-LUN) received from the multi-reader/writer 1, and data indicating that the OS is a low-level OS. In the present embodiment, the inquiry data that the filter driver 62 returns to the OS is always the same data.

Next, the OS kernel 65 establishes drive letters for the file system 61 [17]. In the present embodiment, "E" is assigned as the drive letter corresponding to the multi-reader/writer 1.

Next, operations for modifying the LUN layout according to the second embodiment will be described. In the first embodiment described above, it was possible to set a plurality of the virtual logical units VU with the high-level OS and to arbitrarily modify the correspondence relationships between virtual logical units VU and physical logical units PU using the LUN layout tool 64. However, since a low-level OS is installed in the second embodiment, it is only possible to set one virtual logical unit VU, while all physical logical units PU are associated with the one virtual logical unit (V-LUN0). Hence, the only modifications possible in the LUN layout according to the second embodiment are modifications of the priority of the physical logical units PU in the virtual logical unit V-LUN0.

As shown in FIG. 12, after starting up, the LUN layout tool 64 first issues the SCSI command "Inquiry" [40]. In response, the filter driver 62 returns inquiry data for the virtual logical unit V-LUN0 to the LUN layout tool 64 [41].

Next, the LUN layout tool 64 reads the LUN map 63 from the registry 34d [42]. The LUN layout tool 64 displays the LUN layout settings window in the display 39 of the personal computer 30 according to the LUN map 63 read above, showing the current LUN layout to the user.

The user subsequently performs layout operations described with reference to FIG. 7A to arrange the icons as desired [43]. At this time, based on the inquiry data received from the filter driver 62 indicating that the OS is a low-level OS, the LUN layout tool 64 disables operations for associating physical logical units PU with any virtual logical unit VU other than the virtual logical unit V-LUN0. Once the user sets the LUN layout, the LUN layout tool 64 overwrites the LUN map 63 in the registry 34d [44] and ends the process.

Next, an inquiry reception process will be described with reference to FIG. 13. FIG. 13 is a flowchart illustrating steps in the inquiry reception process. This process begins when the OS kernel 65 issues the SCSI command "Inquiry."

When the OS kernel 65 issues the SCSI command "Inquiry," in S22 the filter driver 62 determines whether the type stored in the OS type memory area 33b indicates that the OS stored in the OS memory area 34a is a low-level OS. If such data has not yet been stored in the OS type memory area 33b (S22: NO), then in S24 the filter driver 62 stores this data in the OS type memory area 33b because the fact that the OS issues the "Inquiry" command without initially issuing the USB command "GET_MAX_LUN" indicates that the OS is a low-level OS.

Next, in S26 the filter driver 62 issues the USB command "GET_MAX_LUN" to the multi-reader/writer 1 and stores the largest P-LUN (MAX-P-LUN) received from the multi-reader/writer 1 in response to this USB command "GET_MAX_LUN" in the maximum P-LUN memory area 33a. In S28 the filter driver 62 sets a variable P-LUN to "0".

In S30 the filter driver 62 issues the SCSI command "Inquiry" including the P-LUN indicated by the variable P-LUN, acquires inquiry data returned from the multi-reader/writer 1 in response to this command and stores the data in the RAM 33. Since the variable P-LUN is "0" initially, the filter driver 62 stores inquiry data for the physical logical unit P-LUN0 in the RAM 33 at this time.

In S32 the filter driver 62 increments the variable P-LUN by "1". In S34 the filter driver 62 determines whether the value of the variable P-LUN is less than or equal to the MAX-P-LUN (largest P-LUN).

While the value of the variable P-LUN is less than or equal to MAX-P-LUN (S34: YES), the filter driver 62 returns to S30 and repeats the process described above. However, when the value of the variable P-LUN exceeds the MAX-P-LUN (S34: NO), indicating that inquiry data has been acquired for all physical logical units PU, then in S36 the filter driver 62 returns inquiry data to the OS kernel 65. From the perspective of the OS kernel 65, the OS kernel 65 receives inquiry data as a response to the SCSI command "Inquiry."

However, if the filter driver 62 determines in S22 described above that the OS type memory area 33b already stores data indicating that the OS stored in the OS memory area 34a is a low-level OS (S22: YES), then the filter driver 62 skips the process described from S24 to S34 and simply returns the inquiry data in S36.

According to the second embodiment described above, while a plurality of physical logical units PU are assigned to a single virtual logical unit VU, the physical logical unit PU for which external memory is actually inserted in the slot can be set as the accessible logical unit, enabling data communications with that logical unit. If the external memory is exchanged, the physical logical unit PU for which external memory is actually inserted is automatically detected and registered as the accessible logical unit. Accordingly, even when a low-level OS is installed on the personal computer 30, the OS can be made to recognize different physical logical units PU, without requiring the user to restart the personal computer 30 or perform another troublesome task, such as disconnecting and reconnecting the USB cable 26 to the terminal of the personal computer 30.

Next, a filter driver 66 executed on the personal computer 30 connected to a multi-reader/writer 100 according to a third embodiment will be described with reference to FIG. 14. In the first and second embodiments described above, the multi-reader/writer 1 connected to the personal computer 30 did not possess a built-in memory. The third embodiment differs in that the multi-reader/writer 100 connected to the personal computer 30 is provided with a nondetachable internal flash memory 15, in addition to the slots 11, 12, and 13 for detachably mounting the external memory cards 21, 22, and 23. In the third embodiment, like parts and components to those described in the first embodiment have been designated with the same reference numerals to avoid duplicating description.

Figure 14:
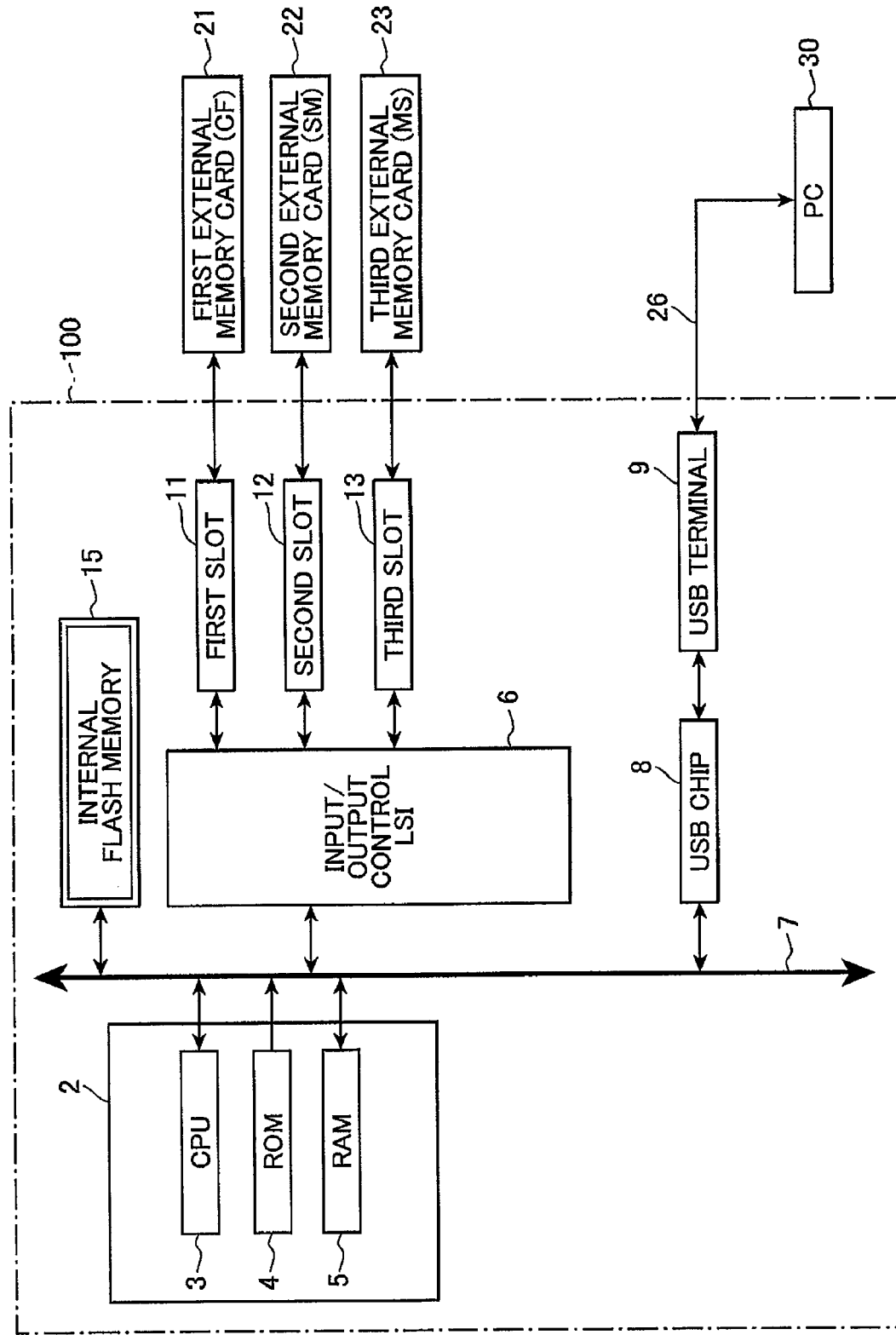
FIG. 14 is a block diagram showing the electrical structure of a multi-reader/writer used in a third embodiment.

FIG. 14 is a block diagram showing the electrical structure of the multi-reader/writer 100 used in the third embodiment. As shown in FIG. 14, the multi-reader/writer 100 includes the internal flash memory 15 storing data that is read/write accessible by the personal computer 30 through file operations. The internal flash memory 15 is connected to the bus 7.

Hence, the multi-reader/writer 100 employed in the third embodiment has a total of four types of memory accessible from the personal computer 30, i.e., the external memory cards 21, 22, and 23 and the internal flash memory 15. Accordingly, the multi-reader/writer 100 can function as having a total of four physical logical units PU. By connecting the multi-reader/writer 100 to the personal computer 30 with the USB cable 26, a data processing system is constructed in which the personal computer 30 can access the external memory cards 21, 22, and 23 and the internal flash memory 15 of the multi-reader/writer 100.

In the third embodiment, the filter driver 66 (see FIG. 16) has been installed in the filter driver memory area 34b of the personal computer 30 in place of the filter driver 62 described in the first and second embodiments. As with the filter driver 62 described in the first and second embodiments, the filter driver 66 operates in the lower layer of the OS and functions to control data transferred between the OS and the multi-reader/writer 100. However, the filter driver 66 is used for the multi-reader/writer 100 having the internal flash memory 15 and differs from the filter driver 62 according to the first and second embodiments.

Figure 15:
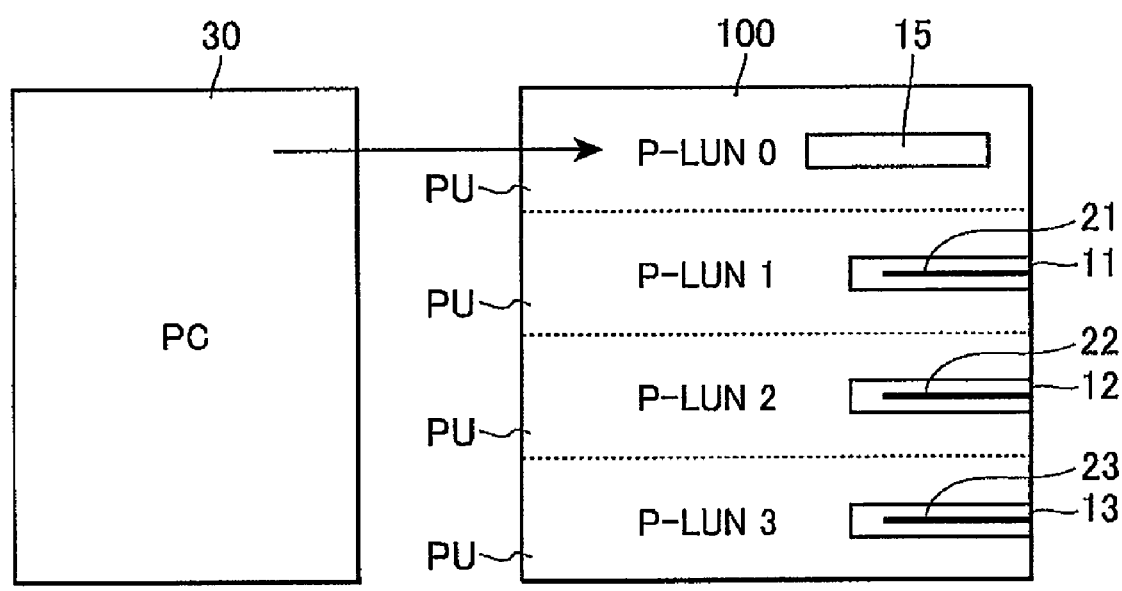
FIG. 15 is a block diagram conceptually illustrating a personal computer and the multi-reader/writer according to the third embodiment.

FIG. 15 conceptually illustrates the multi-reader/writer 100 and the personal computer 30. As shown in FIG. 15, the multi-reader/writer 100 includes the slots 11, 12, and 13 for inserting the three types of external memory cards 21, 22, and 23, and the internal flash memory 15. Hence, while the multi-reader/writer 100 is a single physical device, the multi-reader/writer 100 functions as four physical logical units PU enabling access to different types of memory.

In the present embodiment, as shown in FIG. 15, P-LUN0 is assigned to the physical logical unit PU reading or writing data with the internal flash memory 15; P-LUN1 is assigned to the physical logical unit PU reading or writing data with the first external memory card 21; P-LUN2 is assigned to the physical logical unit PU reading or writing data with the second external memory card 22; and P-LUN3 is assigned to the physical logical unit PU reading or writing data with the third external memory card 23.

Hence, if the personal computer 30 transmits a command specifying the P-LUN0, for example, data communication can be implemented between the personal computer 30 and the physical logical unit PU specified by P-LUN0. In this way, a data processing system is constructed in which the personal computer 30 can access the internal flash memory 15 or each of the external memory cards 21, 22, and 23 mounted in the slots 11, 12, and 13 of the multi-reader/writer 100.

Figure 16:
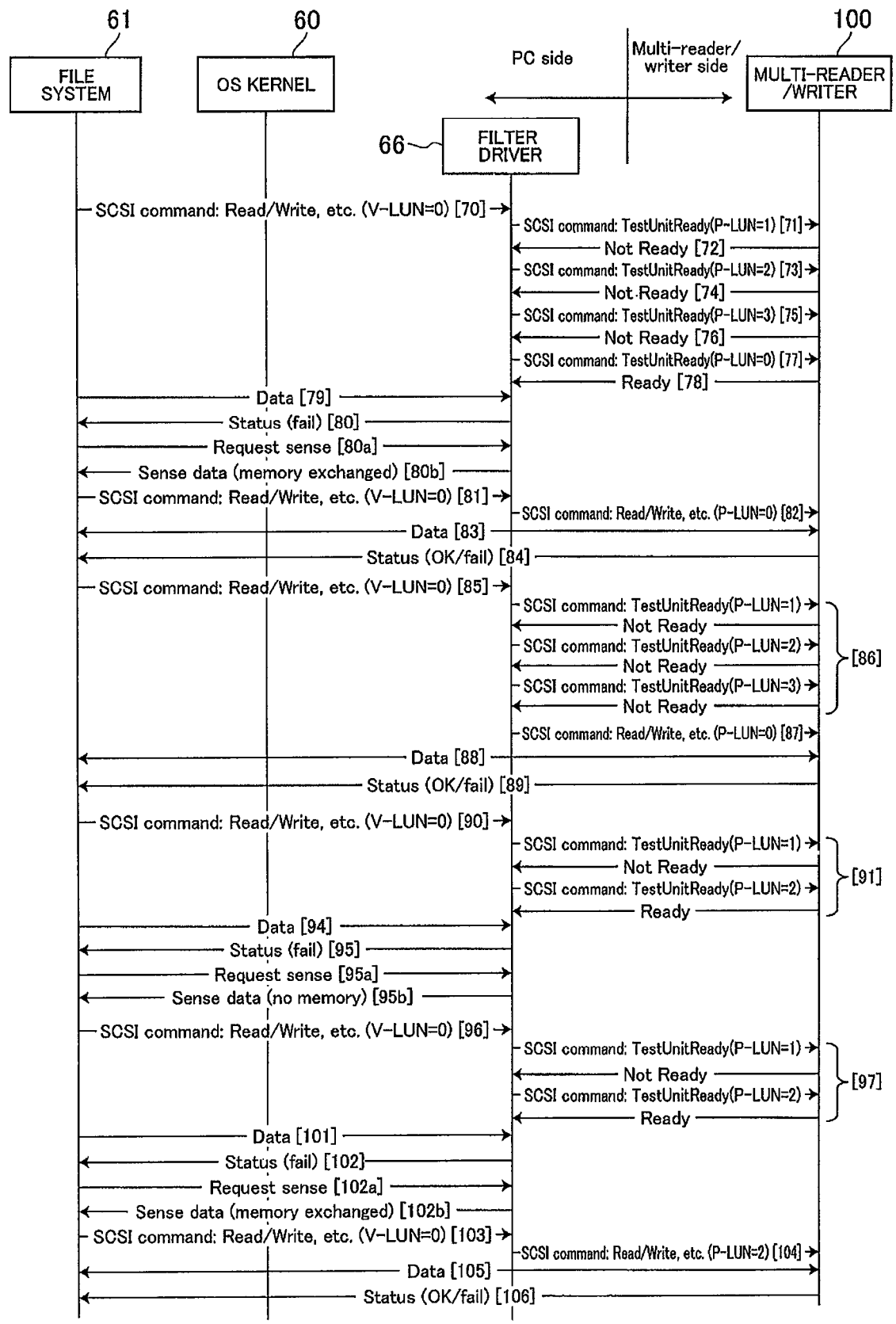
FIG. 16 is an explanatory diagram conceptually illustrating data communications between the personal computer and the multi-reader/writer.

Next, various data exchanges between the above-described personal computer 30 and the multi-reader/writer 100 will be described with reference to FIG. 16. FIG. 16 conceptually illustrates data communications between the personal computer 30 and multi-reader/writer 100. The initial part of the process up through the determination of drive letters will not be described since this process is identical to that in the first embodiment described with reference to FIG. 9. Here, data communications after drive letters have been established will be described. As in the first embodiment, all physical logical units PU are associated with the virtual logical unit VU in this description.

First, the file system 61 issues a SCSI command "Read/Write (V-LUN=0)" specifying the virtual logical unit V-LUN0 [70]. At this time, the accessible physical logical unit PU corresponding to the P-LUN0 has not yet been registered.

When the accessible physical logical unit PU has not yet been registered, the filter driver 66 acquires the P-LUNs associated with the V-LUN (0 in this case) included in the SCSI command from the LUN map 63 and issues the SCSI command "TestUnitReady" for these P-LUNs in order. In this example, it will be assumed that physical logical units P-LUN0, P-LUN1, P-LUN2, and P-LUN3 are associated with the V-LUN0.

As in the first embodiment described above, when issuing the SCSI command "TestUnitReady" to each of the physical logical units P-LUN0, P-LUN1, P-LUN2, and P-LUN3, the filter driver 66 issues the SCSI commands in order based on the priorities set in the LUN map 63 (see [13] in FIG. 9).

However, while the filter driver 66 in the present embodiment issues the SCSI command "TestUnitReady" based on the priorities in the LUN map 63, the third embodiment differs from the first embodiment in that the physical logical unit P-LUN0 assigned to the internal flash memory 15 is issued the SCSI command "TestUnitReady" last. In other words, the commands are issued to the physical logical units P-LUN1, P-LUN2, and P-LUN3 assigned to the external memory cards 21, 22, and 23 first so that the filter driver 66 can give priority to detecting physical logical units PU for which the external memory cards 21, 22, and 23 are mounted.

Hence, the filter driver 66 first issues the SCSI command "TestUnitReady (P-LUN=1)" to the multi-reader/writer 100 [71]. If the first external memory card 21 is inserted in the first slot 11, the multi-reader/writer 100 indicates this by returning the command "Ready." In this example, the first external memory card 21 is not inserted in the first slot 11, and the multi-reader/writer 100 indicates this by returning the command "Not Ready" [72].

Next, the filter driver 66 issues the SCSI command "TestUnitReady (P-LUN=2)" to the multi-reader/writer 100 [73]. In this example, the second external memory card 22 is not inserted in the second slot 12, and the multi-reader/writer 100 indicates this by returning the command "Not Ready" [74].

Next, the filter driver 66 issues the SCSI command "TestUnitReady (P-LUN=3)" to the multi-reader/writer 100 [75]. In this example, the third external memory card 23 is not inserted in the third slot 13, and the multi-reader/writer 100 indicates this by returning the command "Not Ready" [76].

In this way, the filter driver 66 issues the SCSI command "TestUnitReady" to all physical logical units other than the physical logical unit P-LUN0 to which the internal flash memory 15 is associated. If each of these units responds with "Not Ready," then the filter driver 66 ultimately issues the SCSI command "TestUnitReady" for the physical logical unit P-LUN0 to which the internal flash memory 15 is associated [77]. Since the internal flash memory 15 is permanently mounted, the internal flash memory 15 returns the command "Ready" [78].

If data is subsequently outputted from the file system 61 following the SCSI command "Read/Write (V-LUN=0)" [79], the filter driver 66 reads and discards this data without transferring the data to the multi-reader/writer 100 and transmits a status to the file system 61 indicating that the data outputted from the file system 61 to the multi-reader/writer 100 failed [80]. After the filter driver 66 issues this status, the file system 61 issues a SCSI command "Request Sense" [80a]. In response to this command, the filter driver 66 transfers sense data indicating that memory has been exchanged [80b].

Upon receiving this sense data indicating that memory has been exchanged, the file system 61 discards the previously used memory management data. The file system 61 also reissues the SCSI command "Read/Write (V-LUN=0)" [81]. However, this time the physical logical unit P-LUN0 has been registered as the accessible physical logical unit corresponding to the virtual logical unit V-LUN0.

Hence, when the filter driver 66 receives the SCSI command "Read/Write (V-LUN=0)," the filter driver 66 modifies the SCSI command to the SCSI command "Read/Write (P-LUN0)." In other words, the filter driver 66 modifies the command to specify the physical logical unit P-LUN0 and issues this modified command to the multi-reader/writer 100 [82].

Through this process, data reading and writing can be performed between the file system 61 and the multi-reader/writer 100. Specifically, the multi-reader/writer 100 transmits data and the status [83] and [84] in response to the SCSI command "Read/Write" from the file system 61. More specifically, it is possible to access one of the external memory cards 21, 22, and 23 by specifying the virtual logical unit V-LUN0 while the external memory card 21, 22, or 23 is inserted in one of the slots, and to access the internal flash memory 15 by specifying the virtual logical unit V-LUN0 when none of the external memory cards 21, 22, and 23 have been inserted.

Next, a description will be given for the process performed to register the physical logical unit P-LUN0 corresponding to the internal flash memory 15 as the accessible physical logical unit corresponding to the virtual logical unit.

When the file system 61 issues the SCSI command "Read/Write (V-LUN=0)" [85], the filter driver 66 first confirms whether the physical logical unit P-LUN0 corresponding to the internal flash memory 15 is registered as the accessible physical logical unit PU for the virtual logical unit V-LUN0. Then, the filter driver 66 determines whether a prescribed time (20 seconds in the present embodiment) has elapsed since the OS issued the previous SCSI command (more specifically, a SCSI command other than "TestUnitReady"). If the prescribed time has elapsed, then the filter driver 66 sequentially issues SCSI commands "TestUnitReady" while specifying each of the P-LUNs corresponding to the V-LUN0 in the LUN map 63 other than the currently registered physical logical unit P-LUN0 and receives responses to these commands [86]. By periodically executing this process, the filter driver 66 can detect whether any of the external memory cards 21, 22, and 23 has been newly inserted into a slot.

In this description, it will be assumed that the external memory cards 21, 22, and 23 have not been newly inserted into the slots 11, 12, and 13 at this time. Hence, all responses to the SCSI command "TestUnitReady" are "Not Ready." Therefore, the filter driver 66 changes the SCSI command "Read/Write (V-LUN=0)" received from the file system 61 to the SCSI command "Read/Write (P-LUN0)." Specifically, the filter driver 66 modifies the command to indicate the physical logical unit P-LUN0 and issues the command to the multi-reader/writer 100 [87].

Consequently, data reading and writing continues between the file system 61 and the physical logical unit P-LUN0 of the multi-reader/writer 100 [88] and [89].

Next, a description will be given for the case in which a new external memory card 21, 22, or 23 is inserted into one of the slots 11, 12, and 13 while the physical logical unit P-LUN0 to which the internal flash memory 15 is associated is registered as the accessible physical logical unit PU. First the file system 61 issues the SCSI command "Read/Write (V-LUN=0)" [90]. If at least 20 seconds has elapsed since the previous SCSI command was issued, the filter driver 66 sequentially issues the SCSI command "TestUnitReady" while specifying each of the P-LUNs associated with the V-LUN0, except the currently registered physical logical unit P-LUN0, as described above, and receives responses to these commands [91]. In this example, a "Ready" response is received for the physical logical unit P-LUN2.

When the "Ready" response is acquired for the physical logical unit P-LUN2, i.e., when memory associated with the physical logical unit P-LUN2 (the second external memory card (SM) 22 in the present embodiment) is newly inserted into the second slot 12, the filter driver 66 deletes the registration of the physical logical unit P-LUN0 to which the internal flash memory 15 is associated as the accessible physical logical unit corresponding to the virtual logical unit V-LUN0.

If the file system 61 subsequently outputs data following the SCSI command "Read/Write (V-LUN=0)" [94], the filter driver 66 reads and discards this data without transferring the data to the multi-reader/writer 100 since an accessible physical logical unit is no longer registered.

The filter driver 66 then transmits a status to the file system 61 indicating that the data outputted to the multi-reader/writer 100 failed [95].

Upon receiving this status, the file system 61 issues the SCSI command "Request Sense" [95a]. In response to this command, the filter driver 66 transfers sense data indicating that no memory exists [95b].

Upon receiving the sense data, the file system 61 reissues the SCSI command "Read/Write (V-LUN=0)" [96]. Accordingly, the filter driver 66 again sequentially issues SCSI commands "TestUnitReady" while specifying the P-LUNs associated with the V-LUN0 and receives responses to these commands [97]. In this example, it will be assumed that the second external memory card 22 is inserted in the second slot 12 and, hence, the multi-reader/writer 100 returns a "Ready" response for the physical logical unit P-LUN2.

When the "Ready" response is obtained for the physical logical unit P-LUN2, the filter driver 66 registers the physical logical unit P-LUN2 as the physical logical unit PU corresponding to the virtual logical unit P-LUN0.

If the file system 61 outputs data following the SCSI command "Read/Write (V-LUN=0)" [101], the filter driver 66 reads and discards this data without transferring the data to the multi-reader/writer 100.

Next, the filter driver 66 issues a status to the file system 61 indicating that the data output to the multi-reader/writer 100 failed [102].

Upon receiving this status, the file system 61 issues the SCSI command "Request Sense" [102a]. In response to this command, the filter driver 66 transfers sense data indicating that the memory has been exchanged [102b].

Upon receiving this sense data, the file system 61 discards the previously used memory management data. The file system 61 also reissues the SCSI command "Read/Write (V-LUN=0)" [103]. However, this time the physical logical unit P-LUN2 associated with the newly inserted second external memory card 22 has been registered as the accessible physical logical unit corresponding to the virtual logical unit V-LUN0.

Hence, when the file system 61 issues the SCSI command "Read/Write (V-LUN=0)," the filter driver 66 modifies the SCSI command to a SCSI command "Read/Write (P-LUN2)" and issues the modified command to the multi-reader/writer 100 [104].

Consequently, data reading and writing can be performed between the file system 61 and the multi-reader/writer 100 [105] and [106].

Figure 17:
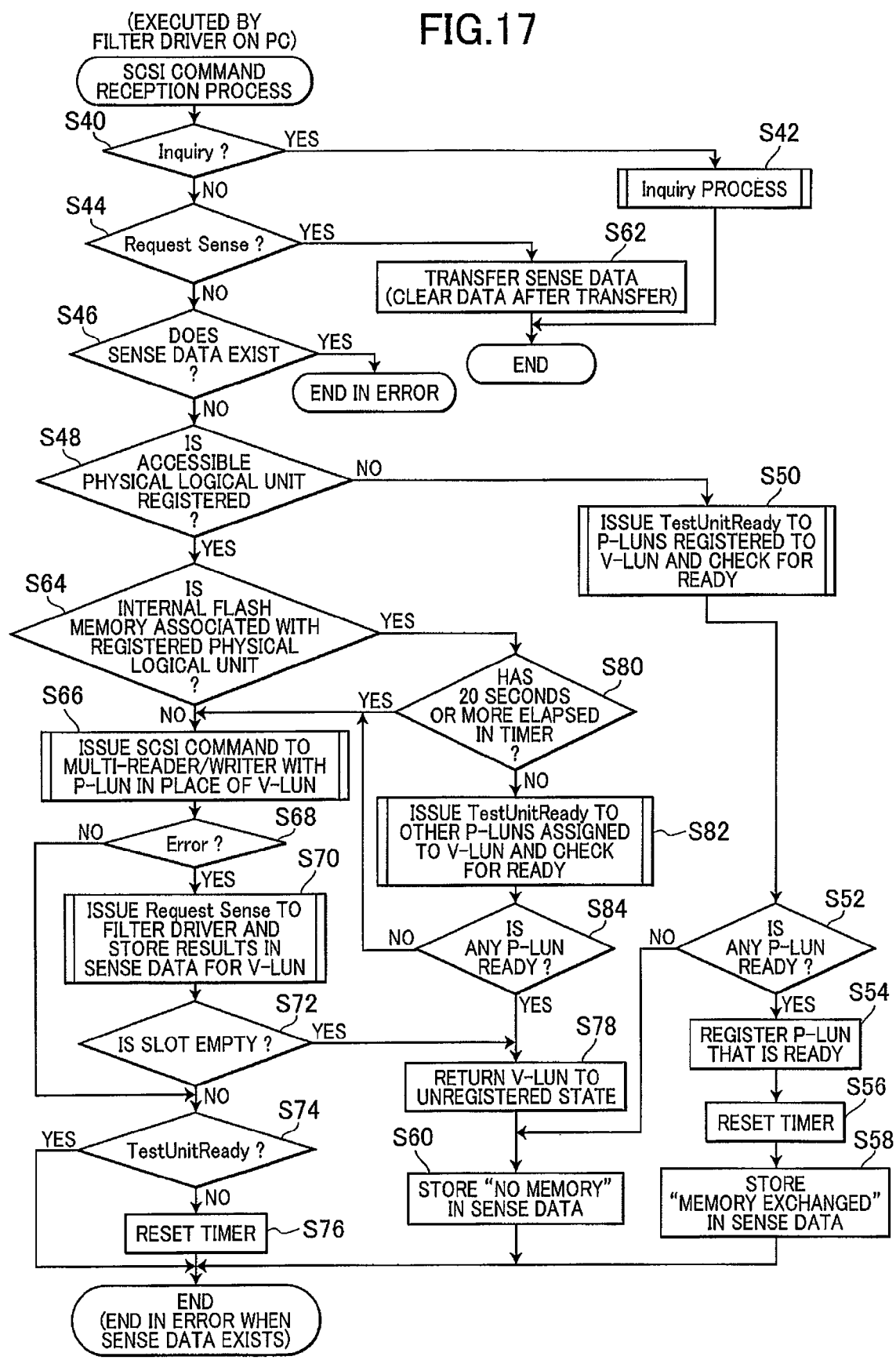
FIG. 17 is a flowchart illustrating steps in a SCSI command reception process that the personal computer executes according to the filter driver.

Next, a SCSI command reception process that the filter driver 66 executes in the personal computer 30 will be described with reference to FIG. 17. FIG. 17 is a flowchart illustrating steps in the SCSI command reception process. This process is executed when the OS issues a SCSI command.

In S40 of the process shown in FIG. 17, the filter driver 66 determines whether the SCSI command issued by the OS is the "Inquiry" command. If the SCSI command is "Inquiry" (S40: YES), then in S42 the filter driver 66 performs an inquiry process. The inquiry process results in the filter driver 66 returning prescribed inquiry data to the OS, and subsequently the current process ends.

However, if the SCSI command issued by the OS is not "Inquiry" (S40: NO), then in S44 the filter driver 66 determines whether the SCSI command is the "Request Sense" command. In this description, it will be assumed that the SCSI command is not "Request Sense" (S44: NO) and that no sense data exists (S46: NO).

Therefore, in S48 the filter driver 66 determines whether an accessible physical logical unit PU has been registered for the V-LUN included in the SCSI command. If an accessible physical logical unit PU has not been registered (S48: NO), then in S52 the filter driver 66 issues SCSI commands "TestUnitReady," including the P-LUNs corresponding to the V-LUN in the SCSI command, to the multi-reader/writer 100 and detects the physical logical unit for which a "Ready" response is obtained. Since this process was described with reference to [71] through [78] in FIG. 16, a more detailed description will not be provided here. If a "Ready" response has been obtained for one of the P-LUNs (S52: YES), then in S54 the filter driver 66 registers the physical logical unit PU having this P-LUN as the accessible physical logical unit. Subsequently, the filter driver 66 resets the timer in S56, stores "memory exchanged" in the sense data in S58, and ends the process.

However, if a "Ready" response has not been obtained for any physical logical unit PU (S52: NO), indicating that no external memory is inserted in the slots, then the filter driver 66 stores "no memory" in the sense data in S60 and ends the process.

If sense data is present when the SCSI command reception process ends, the filter driver 66 issues a status to the OS indicating that the data communication failed. When the input/output control LSI 6 issues this failure status, the OS issues the SCSI command "Request Sense" requesting this sense data. Since the SCSI command issued by the OS in this case is "Request Sense" (S44: YES), in S62 the filter driver 66 transfers the sense data to the OS and subsequently, clears the data. At this time, the SCSI command reception process ends normally. As shown in the flowchart of FIG. 17, the current process always ends in an error if the OS has issued a command other than the SCSI commands "Inquiry" and "Request Sense" as long as sense data exists (S46: YES). In such cases, the filter driver 66 reissues a status to the OS indicating that data communications failed.

However, if an accessible physical logical unit PU has been registered for the V-LUN in the SCSI command issued by the OS (S48: YES) and the memory associated with the registered physical logical unit PU is external memory rather than the internal flash memory 15 (S64: NO), then in S66 the filter driver 66 changes the V-LUN in the SCSI command to the P-LUN registered as the accessible physical logical unit and issues this modified command to the multi-reader/writer 100. If an error response is not received from the multi-reader/writer 100 (S68: NO), then the filter driver 66 advances to S74.

However, if an error response is received from the multi-reader/writer 100 (S68: YES), then in S70 the file system 61 issues the SCSI command "Request Sense" to the filter driver 66 and stores the results in the sense data for the V-LUN. In S72 the filter driver 66 determines whether no external memory is present in the slots. If no external memory is present in the slots (S72: YES), signifying that the accessible external memory has been removed from its slot, then in S78 the filter driver 66 performs a process to cancel the registration of the P-LUN as the accessible physical logical unit. However, when external memory is present in one of the slots (S72: NO), the filter driver 66 advances to S74.

In S74 the filter driver 66 determines whether the SCSI command issued from the OS is "TestUnitReady." If the command is not "TestUnitReady" (S74: NO), then the filter driver 66 resets the timer in S76 and ends the process. However, if the SCSI command is the "TestUnitReady" command (S74: YES), then the filter driver 66 ends the process without resetting the timer.

Further, if the physical logical unit PU registered as the accessible physical logical unit is associated with the internal flash memory 15 (S64: YES) and the prescribed time of 20 seconds or more has elapsed (S80: NO), then in S82 the filter driver 66 issues the SCSI command "TestUnitReady" for all P-LUNs associated with the V-LUN in the SCSI command issued by the OS (all P-LUNs other than the P-LUN associated with the internal flash memory 15). In S84 the filter driver 66 determines whether a "Ready" response has been obtained for one of the P-LUNs. If no "Ready" response has been obtained for any of the P-LUNs (S84: NO), indicating that no external memory has been newly inserted in a slot, the filter driver 66 advances to S66.

However, if a "Ready" response has been obtained for one of the P-LUNs (S84: YES), then in S78 the filter driver 66 cancels the registration for the physical logical unit registered as the accessible physical logical unit PU, returning the V-LUN to an unregistered state. Subsequently, the filter driver 66 stores "no memory" in the sense data in S60 and ends the process.

Figure 18A:
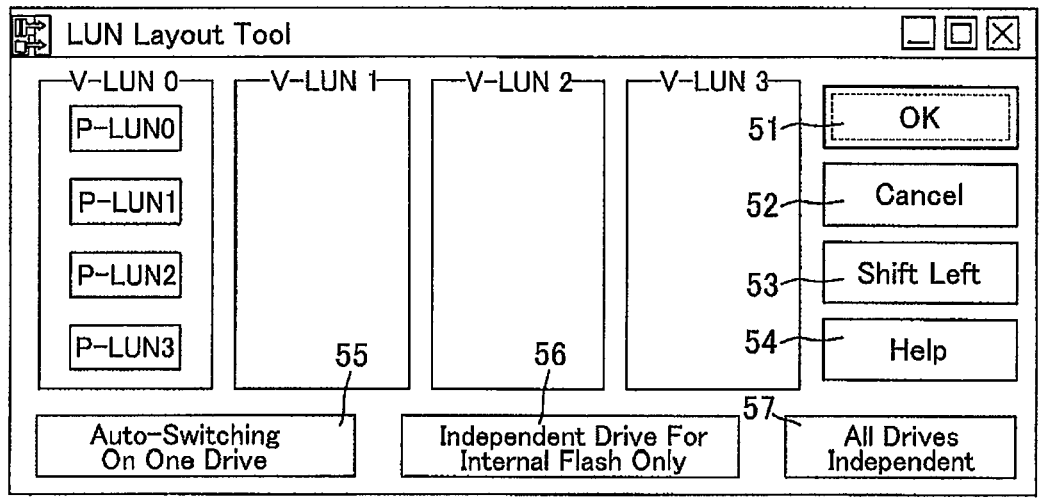
FIGS. 18A through 18C are explanatory diagrams showing sample LUN layout setting windows.
Figure 18B:
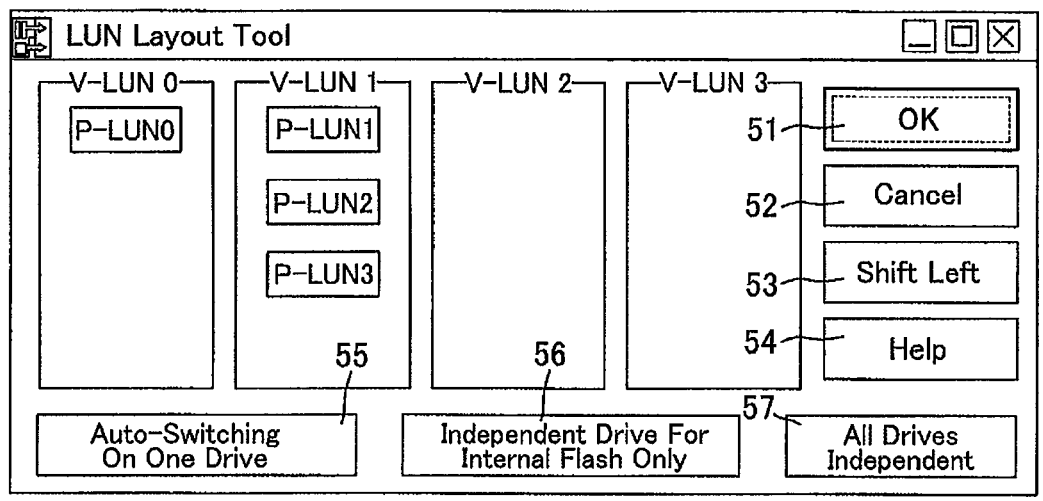
Figure 18C:
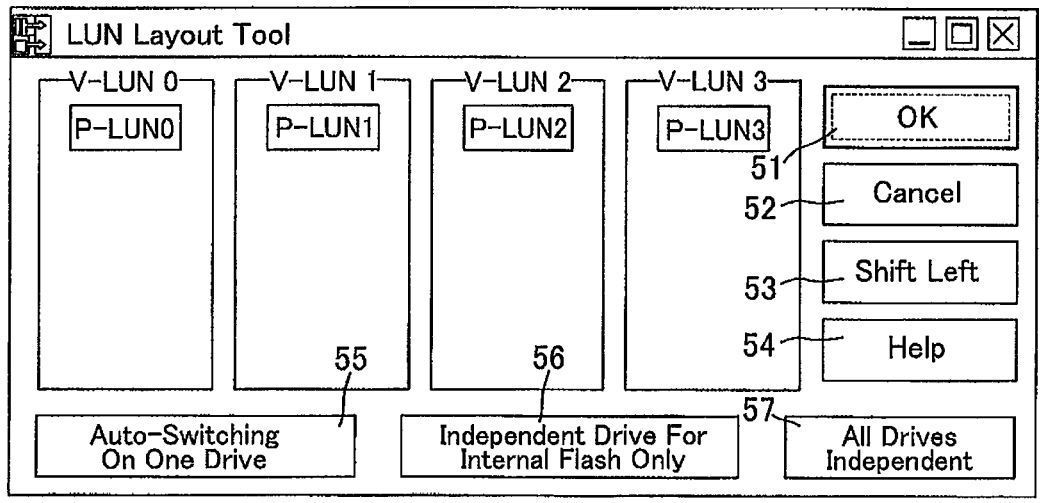

Next, the LUN layout settings window in the third embodiment will be described with reference to FIGS. 18A through 18C. FIGS. 18A through 18C show sample LUN layout settings windows according to the third embodiment, wherein like parts and components with those in the first embodiment have been designated with the same reference numerals to avoid duplicating description.

As shown in FIGS. 18A through 18C, three different layouts have been preset in the LUN layout tool 64 according to the third embodiment. The LUN layout settings window includes an "Auto-switching on one drive" button 55, an "Independent drive for internal flash only" button 56, and an "All drives independent" button 57. By clicking on one of these buttons, the corresponding layout is automatically set, thereby reducing the operation load on the user.

More specifically, as shown in FIG. 18A, by clicking on the "Auto-switching on one drive" button 55, all icons are automatically arranged in the box corresponding to the virtual logical unit V-LUN0. As shown in FIG. 18B, by clicking on the "Independent drive for internal flash only" button 56, the icon for the physical logical unit P-LUN0 corresponding to the internal flash memory 15 is automatically positioned in the box corresponding to the virtual logical unit V-LUN0, while all other icons are automatically arranged in the box for the virtual logical unit V-LUN1. As shown in FIG. 18C, by clicking on the "All drives independent" button 57, each icon is automatically positioned in a separate box corresponding to one of the virtual logical units V-LUN0, V-LUN1, V-LUN2, and V-LUN3.

However, after clicking on one of the preset buttons 55-57 to arrange the layout automatically, the user may still freely modify the layout prior to clicking the OK button 51. Hence, if the user wishes to perform a small modification to an existing layout, the user is free to change the settings in this way.

It is possible to determine automatically whether the physical logical unit number corresponding to the internal flash memory 15 is P-LUN0 according to the following method. First, all memory cards are removed from their slots and the personal computer 30 is restarted (or the USB cable is disconnected). The physical logical unit corresponding to the internal flash memory 15 can then be determined to be the only physical logical unit that is ready when the filter driver is loaded.

While the invention has been described in detail with reference to the above aspects thereof, it would be apparent to those skilled in the art that various changes and modifications may be made therein without departing from the spirit of the invention.

For example, in the above-described embodiments, all physical logical units PU in the multi-reader/writer 1 were associated with one of the virtual logical units VU. However, it is not necessary for all physical logical units PU to be associated with a virtual logical unit VU. For example, physical logical units PU that are used with less frequency can be made inaccessible from the personal computer 30 by setting the LUN layout in the LUN layout settings window so that these physical logical units PU are not associated with any virtual logical unit VU. This method is effective when the user wishes to prevent the personal computer from recognizing media that should absolutely not be used.

Further, the invention is not limited to the five types of media in the above-described embodiments (CompactFlash, SmartMedia, Memory Stick, SD Cards, and internal flash memory), but may also be applied to a multi-reader/writer in which Microdrives, MultiMediaCards, xD-Picture Cards, Memory Stick Duo Cards, PC Cards, and other media can be inserted.

What is claimed is:

1. A storage medium storing a set of program instructions executable on a data processing device that is configured to be connected to a peripheral device having a plurality of storage units, the data processing device having an operating system that manages the plurality of storage units, the set of program instructions comprising:

acquiring a number of at least one virtual unit with which at least one of the plurality of storage units is associated, the number of at least one virtual unit being set smaller than a total number of the plurality of storage units;

receiving, from the operating system, a first command including a first logical unit number that specifies one of the at least one virtual unit;

registering, as an accessible storage unit for a second logical unit number, a single storage unit from among the at least one of the plurality of storage units that is associated with the one of the at least one virtual unit specified by the first command, the single storage unit being in condition for communicating data with the data processing device;

modifying the first command including the first logical unit number to a second command including the second logical unit number that specifies the accessible storage unit; and outputting the second command to the peripheral device so as to execute data communication with the accessible storage unit.

2. The storage medium according to claim 1, wherein the set of program instructions further comprises:
determining whether the accessible storage unit has already been registered in the registering instruction; and
detecting the single storage unit when it is determined in the determining instruction that the accessible storage unit has not been registered; and
wherein the registering instruction includes registering, as the accessible storage unit, the single storage unit detected in the detecting instruction.

3. The storage medium according to claim 2, wherein the peripheral device accepts a plurality of types of media capable of storing data, each of the plurality of types of media being assigned to one of the plurality of storage units; and
wherein the detecting instruction includes detecting, as the single storage unit, a storage unit in which an assigned media is mounted.

4. The storage medium according to claim 3, wherein the peripheral device includes at least one internal medium that is provided nondetachably in the peripheral device, and at least one slot in which an external medium can be detachably mounted;
wherein the plurality of storage units is assigned to respective ones of both the at least one internal medium and the at least one slot; and
wherein the detecting instruction includes detecting a first storage unit that is assigned to the at least one slot before detecting a second storage unit that is assigned to the at least one internal medium.

5. The storage medium according to claim 4, wherein the detecting instruction includes detecting the single storage unit when a prescribed time has elapsed after the second storage unit has been registered as the accessible storage unit in the registering instruction; and
wherein the registering instruction includes registering the first storage unit as the accessible storage unit when the first storage unit has been detected as the single storage unit in the detecting instruction.

6. The storage medium according to claim 4, wherein the set of program instructions further comprises canceling registration of the accessible storage unit when the external medium assigned to the accessible storage unit has been removed from the at least one slot.

7. The storage medium according to claim 1, wherein the set of program instructions further comprises:
inputting a desired number of at least one virtual unit through an operating unit that is operated by a user;
receiving, from the operating system, a third command that requests the total number of the plurality of storage units; and
returning, to the operating system, the desired number of at least one virtual unit inputted through the operating unit as a response to the third command.

8. The storage medium according to claim 1, wherein the operating system displays the at least one virtual unit on a display unit; and
wherein, when one of the at least one virtual unit displayed on the display unit is specified by a user, the operating system issues the first command including the first logical unit number that specifies the one of the at least one virtual unit specified by the user.

9. A method for managing a peripheral device having a plurality of storage units and connected to a data processing device, the method comprising:
acquiring a number of at least one virtual unit with which at least one of the plurality of storage units is associated, the number of at least one virtual unit being set smaller than a total number of the plurality of storage units;
receiving, from an operating system stored in the data processing device, a first command including a first logical unit number that specifies one of the at least one virtual unit;
registering, as an accessible storage unit for a second logical unit number, a single storage unit from among the at least one of the plurality of storage units that is associated with the one of the at least one virtual unit specified by the first command, the single storage unit being in condition for communicating data with the data processing device;
modifying the first command including the first logical unit number to a second command including the second logical unit number that specifies the accessible storage unit; and
outputting the second command to the peripheral device so as to execute data communication with the accessible storage unit.

* * * * *